(12) United States Patent
Ibeid et al.

(10) Patent No.: US 9,771,281 B2
(45) Date of Patent: Sep. 26, 2017

(54) PROCESSES AND APPARATUSES FOR REMOVAL OF CARBON, PHOSPHORUS AND NITROGEN

(71) Applicants: Valorbec Société en Commandite, Montreal (CA); UNIVERSITY OF MANITOBA, Winnipeg (CA)

(72) Inventors: Sharif Ibeid, Brossard (CA); Maria Elektorowicz, Lachine (CA); Jan Oleszkiewicz, Winnipeg (CA)

(73) Assignees: VALORBEC, s.e.c., Montréal (CA); THE UNIVERSITY OF MANITOBA, Winnipeg (CA)

( * ) Notice: Subject to any disclaimer, the term of this patent is extended or adjusted under 35 U.S.C. 154(b) by 0 days.

(21) Appl. No.: 14/377,465

(22) PCT Filed: Feb. 8, 2013

(86) PCT No.: PCT/CA2013/000113
§ 371 (c)(1),
(2) Date: Aug. 7, 2014

(87) PCT Pub. No.: WO2013/116935
PCT Pub. Date: Aug. 15, 2013

(65) Prior Publication Data
US 2015/0001094 A1    Jan. 1, 2015

Related U.S. Application Data

(60) Provisional application No. 61/596,471, filed on Feb. 8, 2012.

(51) Int. Cl.
*C02F 1/467* (2006.01)
*C02F 3/00* (2006.01)
(Continued)

(52) U.S. Cl.
CPC ............ *C02F 1/4672* (2013.01); *C02F 3/005* (2013.01); *C02F 3/301* (2013.01); *C02F 3/302* (2013.01);
(Continued)

(58) Field of Classification Search
CPC .......... B09C 1/002; C02F 3/302; C02F 3/305; C02F 3/307; C02F 3/005;
(Continued)

(56) References Cited

U.S. PATENT DOCUMENTS 4,755,305 A    7/1988  Fremont et al.
5,048,404 A    9/1991  Bushnell et al.
(Continued)

FOREIGN PATENT DOCUMENTS

DE    3838170 A1 *  5/1990
WO    2010147683     12/2010
WO    2012167375     12/2012

OTHER PUBLICATIONS

Suthersan, S.S. "In situ bioremediation." (Chapter 5). Remediation engineering: design concepts. CRC Press LLC. (no month) 1999.*
(Continued)

*Primary Examiner* — Steven A. Friday
(74) *Attorney, Agent, or Firm* — Bereskin & Parr LLP/S.E.N.C.R.L., s.r.l.

(57) ABSTRACT

There are provided processes for treating wastewater. The processes can comprise treating a mixture comprising the wastewater and an activated sludge, in a single reactor, with an electric current having a density of less than about 55 A/m$^2$, by means of at least one anode and at least one cathode that define therebetween an electrical zone for treating the mixture; exposing the mixture to an intermittent ON/OFF electrical exposure mode to the electric current in which an OFF period of time is about 1 to about 10 times
(Continued)

longer than an ON period of time; and maintaining an adequate oxidation-reduction potential in the single reactor. Such processes allow for substantial removal of carbon, nitrogen and phosphorus from the wastewater in the single reactor of various forms and for obtaining another mixture comprising a treated wastewater and solids.

22 Claims, 16 Drawing Sheets

(51) Int. Cl.
  C02F 3/30 (2006.01)
  C02F 1/463 (2006.01)
  C02F 3/20 (2006.01)
  C02F 1/461 (2006.01)
  C02F 103/34 (2006.01)
  C02F 3/12 (2006.01)
(52) U.S. Cl.
  CPC ............ C02F 1/463 (2013.01); C02F 3/1273 (2013.01); C02F 3/20 (2013.01); C02F 3/307 (2013.01); C02F 2001/46133 (2013.01); C02F 2001/46171 (2013.01); C02F 2103/34 (2013.01); C02F 2201/003 (2013.01); C02F 2201/4614 (2013.01); C02F 2201/4615 (2013.01); C02F 2201/46155 (2013.01); C02F 2201/46175 (2013.01); C02F 2203/004 (2013.01); C02F 2209/04 (2013.01); C02F 2209/08 (2013.01); C02F 2209/14 (2013.01); C02F 2209/16 (2013.01); C02F 2209/18 (2013.01); C02F 2209/22 (2013.01); C02F 2209/44 (2013.01); C02F 2303/04 (2013.01); Y02W 10/15 (2015.05)
(58) Field of Classification Search
  CPC ........ C02F 3/12–3/26; C02F 3/30–3/38; C02F 2201/4615
  See application file for complete search history.

(56) References Cited

U.S. PATENT DOCUMENTS

| | | | |
|---|---|---|---|
| 5,695,650 | A | 12/1997 | Held |
| 6,274,028 | B1 | 8/2001 | Hu et al. |
| 6,491,820 | B2 | 12/2002 | Held et al. |
| 6,645,366 | B2 | 11/2003 | Iseki et al. |
| 7,648,631 | B2 | 1/2010 | Choi et al. |
| 2006/0000769 | A1 | 1/2006 | Miklos |
| 2009/0321251 | A1 | 12/2009 | Rigby |
| 2010/0051542 | A1 | 3/2010 | Elektorowicz et al. |
| 2012/0132521 | A1 | 5/2012 | Silver et al. |

OTHER PUBLICATIONS

IHS Engineering360. "Oxidation Reduction Potential (ORP) Instruments Information" Retrieved on Oct. 5, 2015 at <http://www.globalspec.com/learnmore/sensors_transducers_detectors/chemical_sensors/oxidation_reduction_potential_orp_instruments>.*
van Haandel, A. and van der Lubbe, J. Handbook Biological Waste Water Treatement: Design and optimisation of activated sludge systems. Sections 4.2.2 and 4.3.1 "Operational factors influencing nitrification" and "Conditions for denitrification" Sep. 2007. <http://www.wastewaterhandbook.com/webpg/hb_contents1.htm> pp. 108-110 and 116-117.*
Jacob, R. and Cordaro E. "Wastewater Treatment." Feb. 2001 capture of <http://www.rpi.edu/dept/chem-eng/Biotech-Environ/Environmental/Overview.html>.*
Akin, B.S. and Ugurlu, A. "Monitoring and control of biological nutrient removal in a Sequencing Batch Reactor" Process Biochemistry. Jul. 2005. vol. 40, Issue 8. pp. 2873-2878.*
Ibeid, "Education and Training Credits at WEFTEC", Oct. 2011.
Tiehm et al., "Bio-electro-remediation: electrokinetic transport of nitrate in a flow-through system for enhanced toluene biodegradation", J Appl Electrochem (2010) 40:1263-1268.
Hasan et al., "Pilot Submerged Membrane Electro-Bioreactor (SMEBR) for COD, Nutrients and Heavy Removal", 2012.
Wang et al., "Aerobic Denitrification of Nitrate Wastewater and dynamic analysis of the Microbial Community in a Bio-ceramic Reactor", 978-1-4244-2902-8/09/$25.00 (2009) IEEE.
Qu et al., "Dentrification of drinking water by a combined process of heterotrophication and electrochemical autotrophication", J. Envioron. Sci. Health, A37(4), 651-665 (2002).
Vasudevan et al., "Remediation of Phosphate-Contaminated Water by Electrocoagulation with Aluminium, Aluminium Alloy and Mild Steel Anodes", http://www.sciencedirect.com/science/article/pii/S0304389408014064, May 30, 2009.
English Abstract of JP11262797, "Sewage Treatment Apparatus", published on Sep. 28, 1999.
English Abstract of JP2005138091, "Method for Removing Nitrogen and Phosphorus in Waste Water", published on Jun. 2, 2005.
Irdemez et al., "Optimization of Phosphate Removal from Wastewater by Electrocoagulation with Aluminum Plate Electrodes", http://www.sciencedirect.com/science/article/pii/S1383586606001857, Mar. 9, 2006.
Chapter 6, "Water Treatment Processes for Reducing Nitrate Concentrations", (1997).
Gharibi et al., "Phosphorous removal from wastewater effluent using electro-coagulation by aluminum and iron plates", Anal. Bioanal. Electrochem., vol. 2, No. 3, 2010, 165-177.
Ibeid et al., "Complete Removal of Total Nitrogen (N) and Phosphorus (P) in a Single Membrane Electro-Bioreactor", WEDTEC 2011.
Elektorowicz et al., "Pilot Submerged Membrane Electro-Bioreactor (SMEBR) for COD, Nutrients and Heavy Metals Removal", Water Supply and Quality, Stare Jablonki, Poland, Sep. 9-12, 2012.
Salf et al., "Effects of High Electric Fields on Microorganisms", Biochim. Biophys. Acta, 148 (1967) 781-788.
Hülsheger et al., "Killing of Bacteria with Electric Pulses of High Field Strength", Radiat Environ Biophys (1981) 20:53-65.
Ahn et al., "Enhanced biological phosphorus and nitrogen removal using a sequencing anoxic/anaerobic membrane bioreactor (SAM) process", Desalination 157 (2003) 345-352.
Cho et al., "Sequencing anoxic/anaerobic membrane bioreactor (SAM) pilot plant for advanced wastewater treatment", Desalination 178 (2005) 219-225.
Choi et al., "Oxidation Reduction Potential atomatic control potential of intermittently aerated membrane bioreactor for nitrification and denitrification", Water Science & Technology—WST, 60.1, 2009, 167-173.
Fu et al., "Simultaneous nitrification and denitrification coupled with phosphorus removal in an modified anoxic/oxic-membrane bioreactor (A/O-MBR)", Biochemical Engineering Journal 43 (2009) 191-196.
Jianlong et al., "Nitrogen Removal by Simultaneous Nitrification and Denitrification via Nitrite in a Sequence Hybrid Biological Reactor", Chinese Journal of Chemical Engineering, 16(5) 778-784 (2008).
Kim et al., "Effect of an electro phosphorous removal process on phosphorous removal and membrane permeability in a pilot-scale MBR", Desalination 250 (2010) 629-633.
Rezania et al., "Hydrogen-driven denitrification of wastewater in an anaerobic submerged membrane bioreactor: potential for water reuse", Water Science & Technology vol. 54 No. 11-12 pp. 207-214 (2006).
Rezania et al., "Hydrogen-dependent denitrification of water in an anaerobic submerged membrane bioreactor coupled with a novel hydrogen delivery system", Water Research 41 (2007) 1074-1080.
Sunger et al., "Autotrophic denitrification using hydrogen generated from metallic iron corrosion", Bioresource Technology 100 (2009) 4077-4082.

(56) References Cited

OTHER PUBLICATIONS

Trigo et al., "Start-up of the Anammox process in a membrane bioreactor", Journal of Biotechnology 126 (2006) 475-487.

Tsushima et al., "Development of high-rate anaerobic ammonium-oxidizing (anammox) biofilm reactors", Water Research 41 (2007) 1623-1634.

Udert et al., "Effect of heterotrophic growth on nitritation/anammox in a single sequencing batch reactor", Water Science & Technology—WST, 58.2 (2008) 277-284.

Wu et al., "Nitrification-denitrification via nitrite in SBR using real-time control strategy when treating domestic wastewater", Biochemical Engineering Journal 36 (2007) 87-92.

Yang et al., "High-rate nitrogen removal by the Anammox process with a sufficient inorganic carbon source", Bioresource Technology 101 (2010) 9471-9478.

Yoo et al., "Nitrogen Removal from synthetic wastewater by simultaneous nitrification and denitrification (SND) via nitrite in an intermittently-aerated reactor", Wat. Res. vol. 33, No. 1, pp. 145-154, 1999.

Wei, V., et al., Nutrient removal in an electrically enhanced membrane bioreactor, Water Science & Technology, 2009, 3159-3163, vol. 60, n. 12, IWA Publishing, Canada.

Wei, V., et al. Influence of electric current on bacterial viability in wastewater treatment, Water Research, Jul. 19, 2011, 5058-5062, 45, Elsevier, Canada.

\* cited by examiner

PROCESSES AND APPARATUSES FOR REMOVAL OF CARBON, PHOSPHORUS AND NITROGEN

CROSS-REFERENCE TO RELATED APPLICATIONS

The present application is a 35 USC 371 national stage entry of PCT/CA2013/000113 filed on Feb. 8, 2013 and which claims priority on U.S. 61/596,471 filed on Feb. 8, 2012. These documents are hereby incorporated by reference in their entirety.

TECHNICAL FIELD

The present disclosure relates to improvements in the field of waste material treatment. For example, it relates to processes and apparatuses for wastewater treatment.

BACKGROUND OF THE DISCLOSURE

Effluents from wastewater treatment plants pose environmental hazard to the receiving water bodies mainly due to the contents of carbon, phosphorus and nitrogen (C, P and N), particularly if the plant is not designed to perform tertiary nutrient (N, P) treatment. These nutrients are the major stimulants of eutrophication and they should be eliminated from the effluent before discharge into the aquatic environment. Currently, new treatment facilities are designed to remove these nutrients to extremely low levels as a part of sustainable water management. The ever more stringent regulations require the retrofitting of the existing wastewater treatment plants to meet the disposal requirements and reduce the concentration of these nutrients as much as possible. In conventional treatment plants, the removal of C, P and N requires several biological reactors or zones within one reactor working simultaneously at different operating conditions to create the optimum environment for the removal of each individual nutrient.

The aerobic activated sludge reactor is by far the most widely applied method to remove carbon (C) through the oxidation of the organic materials by the microbial biomass. Phosphorus (P) removal involves the recycling of biomass into anaerobic and aerobic zones in order to promote the accumulation of phosphate by micro-organisms in a process known as enhanced biological phosphorus removal (EBPR). Biological P-removal can produce an effluent with soluble P as low as about 0.2 mg/L although designers assume EBPR removals only to 0.5 mg/L. Chemicals such as aluminum sulfate and ferric chloride are common P precipitants that are used as alternatives to the EBPR process or in cases where lower P concentrations are demanded. On the other hand, Nitrogen (N) removal involves sequential aerobic and anoxic biological reactions to achieve complete transformation of the influent ammonium into nitrogen gas. Carbon source is added into the anoxic reactor to sustain the heterotrophic denitrifiers responsible for conversion of nitrate into gas, which is costly. The elimination of all these nutrients in one single reactor is a challenging task.

SUMMARY OF THE DISCLOSURE

According to one aspect, there is provided a process for treating wastewater, the process comprising:
treating a mixture comprising the wastewater and an activated sludge, in a single reactor, with an electric current having a density of less than about 55 A/m$^2$, by means of at least one anode and at least one cathode that define therebetween an electrical zone effective for treating the mixture;
exposing the mixture to an intermittent ON/OFF electrical exposure mode to the electric current in which an OFF period of time is about 1 to about 10 times longer than an ON period of time; and
maintaining an adequate oxidation-reduction potential in the single reactor,
thereby allowing for substantial removal of carbon, nitrogen and phosphorus from the wastewater in the single reactor and for obtaining another mixture comprising a treated wastewater and solids.

According to another aspect, there is provided a process for treating wastewater, said process comprising:
treating a mixture comprising said wastewater and an activated sludge, in a single reactor, with an electric current having a density of less than about 55 A/m$^2$, by means of at least one anode and at least one cathode that define therebetween an electrical zone for treating said mixture;
exposing said mixture to an intermittent ON/OFF electrical exposure mode to said electric current in which an OFF period of time is about 1 to about 10 times longer than an ON period of time; and
maintaining an oxidation-reduction potential in said single reactor between −200 and +200 mV,
thereby allowing for substantial removal of carbon, nitrogen and phosphorus from said wastewater in said single reactor and for obtaining another mixture comprising a treated wastewater and solids.

According to another aspect, there is provided a process for treating wastewater, the process comprising:
treating a mixture comprising the wastewater and an activated sludge, in a single reactor, with an electric current having a density of less than about 55 A/m$^2$, by means of at least one anode and at least one cathode that define therebetween an electrical zone effective for treating the mixture, wherein a ratio volume of the electrical zone/total volume of the reactor is about 0.8 or less;
exposing the mixture to an intermittent ON/OFF electrical exposure mode to the electric current in which an OFF period of time is about 1 to about 20 times longer than an ON period of time; and
maintaining an adequate oxidation-reduction potential in the single reactor,
thereby allowing for substantial removal of carbon, nitrogen and phosphorus from the wastewater in the single reactor and for obtaining another mixture comprising a treated wastewater and solids.

It was found that such processes were effective for providing to a wastewater a high removal efficiency of the unwanted components (C, N and P) in one single operation unit i.e. a single reactor. It was shown that removal efficiency up to more than 97% for C, N and P was possible. For example, it was observed that such processes were efficient for removing carbon through biomass oxidation, removing P through the formation of phosphate complexes while N was transformed into nitrogen gas through electrically changing of the oxidation-reduction potential (ORP) for example between −200 to 200 mV to promote the simultaneous nitrification/denitrification processes in the reactor. It was observed that under such a range of ORP values, nitrification potential was enhanced up to 50% for example due to the activation of anammox (anaerobic ammonium oxidation) bacteria as another nitrification process working in harmony with the aerobic nitrifiers.

It was observed that the processes of the present disclosure can be easily incorporated into the already established facilities, thereby reducing any additional infrastructure related costs. These upgrading processes require the immersion of the electrodes (at adequate distances) into the activated sludge basin to upgrade its performance and the effluent quality. The electro-bioreactor consumes low energy because the system works at low current density (e.g. 15 A/m$^2$), and intermittent exposure to the electrical field (e.g. 5'-ON/20'-OFF). Finally, removing of the major environmentally hazardous nutrients in addition to the improvement of sludge characteristics in one single reactor is an important advancement in wastewater treatment technology that can be considered whenever better treatment quality is a concern.

BRIEF DESCRIPTION OF DRAWINGS

In the following drawings, which represent by way of example only, various embodiments of the disclosure.

DETAILED DESCRIPTION OF VARIOUS EMBODIMENTS

Figure 1:
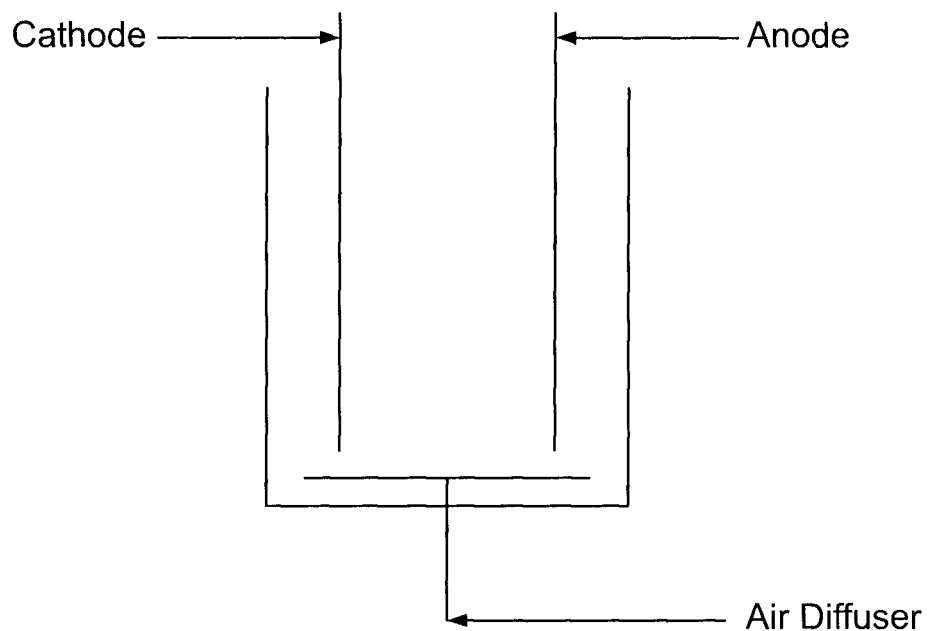
FIG. 1 is a schematic diagram of a bioreactor according to an example of the present disclosure.

The following non-limiting examples further illustrate the technology described in the present disclosure.

The expression "for substantial removal of carbon, nitrogen and phosphorus from the wastewater" as used herein refers, for example, to a removal, in the wastewater, of carbon of at least 50, 75, 85, 90, 95, 97 or 99%, a removal of nitrogen of at least 50, 75, 85, 90, 95, 97 or 99%, and a removal of phosphorus of at least 50, 75, 85, 90, 95, 97 or 99%.

The expression "removal of nitrogen" as used herein refers, for example, to a removal of nitrogen atoms under various forms such as forms chosen from nitrate, nitrite, ammonia, and mixtures thereof. For example, such an expression can refer to Total Nitrogen (TN). For example, such an expression can refer to nitrogen atoms under various forms such as at least two forms chosen from nitrite, nitrate and ammonia. For example, such an expression can refer to nitrogen atoms under various forms that are nitrite, nitrate and ammonia.

The expression "electrical zone" as used herein refers, for example, to a zone disposed between two electrodes and which is effective for carrying out an electrochemical treatment.

The expression "a ratio volume of the electrical zone/total volume of the reactor" as used herein refers, for example, to a ratio obtained by taking the volume of the electrical zone defined by two electrodes divided by the total volume of the reactor.

The expression "maintaining an adequate oxidation-reduction potential in the single reactor" as used herein refers, for example, to maintaining the oxidation reduction potential profile to fluctuate between the anaerobic, anoxic and aerobic conditions to create appropriate operation conditions for the major bacteria responsible for the nitrogen transformation into gas.

The expression "adjusting electrokinetics and dissolved oxygen concentration so as to control activity of different types of bacteria" as used herein refers, for example, to all possibilities and combinations of the current densities, electrical exposure modes, voltage gradients and the dissolved oxygen concentrations that can create an adequate oxidation reduction potential profile.

For example, removal of nitrate can be at least 50, 75, 85, 90, 95, 97, 99 or 99.9%.

For example, removal of nitrite/nitrate can be at least 50, 75, 85, 90, 95, 97, 99 or 99.9%.

For example, the processes can be effective for removing Chemical Oxygen Demand of said wastewater by at least 50, 75, 85, 90, 95, 97, 98 or 99%.

For example, the processes can be effective for removing at least 50, 75, 85, 90, 95, 98, 99, 99.5 or 99.9% of total nitrogen (TN).

For example, the processes can be effective for removing at least 50, 75, 85, 90, 95, 98, or 99.9% of at least one metal from said wastewater.

For example, the at least one metal can be chosen from Al, Pb, Cu, Ni, Cd, Mg, Zn, Fe, Ca and mixtures thereof. Other similar types of metals can also be removed.

For example, wherein the single reactor can comprise a circular anode and a circular cathode. For example, the single reactor can comprise two electrodes, the anode and the cathode.

For example, the at least one cathode and the at least one anode can have a rectangular shape. The single reactor can have a square based prism shape, a rectangular based prism shape, a pentagonal based prism shape and a hexagonal based prism shape. The single reactor can have a cylindrical shape or an oval shape.

For example, a ratio volume of the electrical zone/total volume of the single reactor can be about 0.1 to about 0.8, 0.2 to about 0.6; about 0.25 to about 0.65; about 0.3 to about 0.6; about 0.3 to about 0.5; or about 0.35 to about 0.45. For example, such a ration can be about 0.1, about 0.4 or about 0.75.

For example, the electric current density can be about 1 to about 50 A/m$^2$, about 5 to about 45 A/m$^2$, about 10 to about 35 A/m$^2$, about 12 to about 28 A/m$^2$, about 15 to about 25 A/m$^2$, or about 15 to about 20 A/m$^2$.

For example, the at least anode can comprise aluminum, carbon or iron. For example, the at least cathode can comprise aluminum, carbon or iron. For example, the at least anode can comprise aluminum and the at least cathode can comprise iron. For example, the anode and/or cathode material can be of any type which is capable to change ORP of the reactor.

For example, the OFF period of time can be about 1 to 20, 1 to about 10, 2 to 8, 3 to 7, or 4 to 6 times longer than the ON period of time.

For example, the ON period of time can have duration of about 1 to about 30 minutes, about 1 to about 20 minutes, about 2 to about 16 minutes, about 4 to about 12 minutes, about 3 to 7 minutes, 4 to 6 minutes, about 2 to about 6 minutes or about 5 minutes.

For example, the OFF period of time can have a duration of about 10 to about 180 minutes, about 10 to about 120 minutes, about 12 to about 100 minutes, about 15 to about 60 minutes, about 10 to about 30 minutes, about 12 to about 28 minutes, or about 15 to about 25 minutes.

For example, the oxidation-reduction potential in the single reactor can be maintained between −180 and +180 mV, between −175 and +175 mV, between −160 and +160 mV, between −150 and +150 mV, −100 and +150 mV, or between −125 and +125 mV.

For example, the processes can be carried out with a gradient voltage of about 0.1 V/cm to about 20 V/cm, about 0.1 V/cm to about 10 V/cm, about 0.2 to about 8 V/cm, about 0.3 to about 6 V/cm, or about 0.5 V/cm to about 5 V/cm.

For example, the processes of the present disclosure can be processes in which dissolved oxygen has a concentration of less than about 5.5 mg/L, about 0.05 to about 5.00 mg/L, about 0.1 to about 3.0, about 0.1 to about 2.0 mg/L, about 0.2 to about 1.5 mg/L, or about 0.3 to about 1.25 mg/L.

For example, the at least one cathode and the at least one anode can have an electrical potential difference of about 3 V to about 100 V, about 3 V to about 50 V, about 5 V to about 30 V, about 10 V to about 25 V, or about 10 V to about 20 V.

For example, the solids can comprise organic solids and inorganic solids. For example, the organic solids can comprise carbon removed from the wastewater. For example, the inorganic solids can comprise phosphorus removed from the wastewater. For example, another mixture can comprise $N_2$. For example, during the treatment carried out in the processes of the present disclosure, the nitrogen contained in the wastewater can be converted into $N_2$ and separated from the treated wastewater and from the solids.

For example, the processes can further comprise separating treated wastewater from the solids. For example, treated wastewater can be separated from the solids by means of a membrane.

For example, the electrodes can be effective for performing as heating devices for changing temperature of the reactor.

For example, the processes can be a continuous process.

For example, the processes can be a batch process.

For example, the processes can further include adding an organic carbon conditioner.

For example, processes can further comprise adjusting electrokinetics and dissolved oxygen concentration so as to control activity of different types of microorganisms (such as aerobic nitrifiers, anammox nitrifiers, heterotrophic denitrifiers, hydrogen trophic denitrifiers, polyphosphate accumulating organisms (PAO) that are responsible for biological processes in the reactor (such as removal of P and N).

Electro-bioreactor (FIG. 1) can comprise two electrodes immersed in an activated sludge reactor. The material of the anode can be aluminum and the material of the cathode can be iron. In this reactor, different electrochemical reactions can be taking place once the direct current (DC) field is activated. Each reaction can play a role in removing the targeted nutrients. In this context, three major operating conditions can be considered in order to create the optimal conditions for the removal of C, P, and N:

Current density (CD) is the current (A) passing between the two electrodes divided by the anode surface area (m$^2$). The strength of the current density determines the amount of $Al^{+3}$ and electrons produced into the system (reactions 1 and 2) and the amount of hydrogen gas produced at the cathode (reaction 3), which all play major role in nutrient removal.

Electrical exposure mode (time-ON/time-OFF) that also affects the production rate of $Al^{+3}$, electrons and $H_2$ gas over the operating time. Meanwhile, microorganisms cannot tolerate continuous exposure to the current and can be given enough time-OFF to recover from the electrical impact and resume its biological role in the system.

Dissolved oxygen (DO) concentration can be adjusted in order to create different levels of oxidation-reduction potential (ORP) and promote different bacterial genotypes responsible for the transformation of N and P in the system. For example, such a level can be adjusted by injecting air in the wastewater to be treated.

At the anode:

$$Al \rightarrow Al^{+3} + 3e^- \quad \text{(reaction 1)}$$

$$2H_2O \rightarrow O_{2(gas)} + 4H^+_{(aq)} + 4e^- \quad \text{(reaction 2)}$$

At the cathode:

$$3H_2O + 3e^- \rightarrow 3/2 H_{2(g)} + 3OH^- \quad \text{(reaction 3)}$$

$$\tfrac{1}{2}O_2 + 2e^- + H_2O \rightarrow 2OH^- \quad \text{(reaction 4)}$$

Carbon removal can be achieved in the reactor through the oxidation of organic material by the biomass. Without wishing to be bound to such a theory, it can be said that in the electro-bioreactor, biodegradation is not the sole possible removal pathway of carbon. For example, when the anode comprises Al, the produced $Al^{+3}$ can react with the free $OH^-$ in water to initially form monomeric species such as $Al(OH)^{+2}$, $Al(OH)_2^{+1}$ and $Al(OH)_4^-$. Afterward, these species can be converted into polymeric species such as $Al_8(OH)_{20}^{+4}$, $Al_{13}(OH)_{34}^{+5}$, which eventually can be transformed into a long chain of $Al(OH)_{(s)}$. These cationic hydroxide complexes can effectively adsorb the negatively charged organic materials through the electrostatic forces, particularly those colloids of non-biodegradable nature.

For example, when the anode comprises Al, phosphorus removal can be achieved through the formation of $AlPO_4$ solids or forming complexes with Al(OH)s. Thus, phosphorus becomes part of the suspended solids (inorganic solids) of the system that could be recovered after the solid liquid separation using either a clarifier or membrane modules. In addition to the electrochemical removal of P, biological removal is highly expected to take place because of the capability of the system to work at alternating levels of ORP.

The possibility of removing N in a single reactor can be carried out due to the fact that ORP could be adjusted (due to a combination of electrical and air supply systems) to fluctuate within the anaerobic, anoxic and aerobic conditions, which in return promotes different sorts of bacteria species responsible for complete transforming of ammonium from the influent wastewater into nitrogen gas. The optimum ORP value for each biological processes is given in table 1. For example, maintaining an oxidation-reduction potential in the reactor between −200 and +200 mV allows for such a removal.

TABLE 1

Optimal oxidation-reduction potential (ORP) for different biological processes

| Biological process | Conditions | Optimum ORP |
|---|---|---|
| Nitrification | Aerobic | +100 to +350 |
| Denitrification | Anoxic | −50 to +50 |
| P-removal | Anaerobic stage | −100 to −225 |
|  | Aerobic stage | +25 to +250 |

Electrokinetic phenomena applied to wastewater can regulate ORP levels to promote the simultaneous removal of C, P and N. Without wishing to be bound to such a theory, it can be said that during the processes described in the present document, the mechanism of such an electrical process can, for example, undergo six steps.

Step 1:

Once the DC field is activated, the electrons can be discharged from the anode zone (reaction 1 and 2). Since the dissolved oxygen molecules have the highest electro-negativity (affinity to gain electrons) in the system, most of these discharged electrons can react with the dissolved oxygen (reaction 4) to produce hydroxyl ions. In the electrochemical systems, reaction 4 proceeds reaction 3 until DO is consumed at the cathode surface. Therefore, DO concentration decreases over time as long as the current is on the time-ON mode.

Step 2:

For example, in the case that the concentration of DO in the reactor is too high, the high buffering capacity of the reactor can consume all the electrons and can still hold enough oxygen to act as the major electron acceptor for the biological reactions. In that case, the ORP can stay high (>+100) and it can promote only the autotrophic nitrification process that transforms ammonium into nitrate in the system (reactions 5 and 6 with bacterial species given just as an example of ammonia oxidizers and nitrite oxidizers).

$NH_4 + 3/2 O_2 \rightarrow NO_2^- + H_2O + 2H^+$ *Nitrosomonas* bacteria (reaction 5)

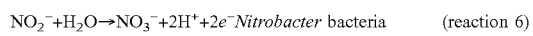

$NO_2^- + H_2O \rightarrow NO_3^- + 2H^+ + 2e^-$ *Nitrobacter* bacteria (reaction 6)

Step 3:

For example, in the case that the dissolved oxygen in the reactor is not too high, the discharged electrons can react with DO until not enough oxygen is available to support the aerobic condition to act as the major electron acceptor. As a result, nitrate as electron acceptor can appear in the system and the ORP can drop from the aerobic limit to the anoxic limit (+50 to −50 mV). At this level of ORP, the heterotrophic nitrifiers can become active and start the conversion of nitrate into $N_2$ gas.

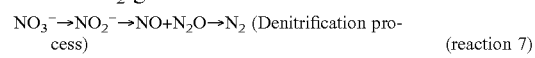

$NO_3^- \rightarrow NO_2^- \rightarrow NO + N_2O \rightarrow N_2$ (Denitrification process) (reaction 7)

Step 4:

To make the system even more powerful and enhance the nitrification potential of the system, the influx of electrons and dissolved oxygen levels can be adjusted for example to lower the ORP of −150 mV. At this level of redox potential, the autotrophic anaerobic ammonium oxidation (anammox) can be activated and starts to nitrify the ammonium using the already existing nitrite in the system as an electron acceptor (reaction 8). Since the rate of anammox is higher than the aerobic autotrophic nitrification, it can be expected to achieve a higher nitrification potential than the reactor operated only at aerobic nitrification as it does in the conventional biological activated sludge reactor.

$NH_4^+ + NO_2^- \rightarrow N_2 + 2H_2O$ (anammox) (reaction 8)

Step 5:

For example, in order to achieve complete and enhanced N removal, the system can fluctuate between a redox potential of −150 mV and +150 mV. For example, nearly 50% of the time the reactor can work at aerobic conditions in order to give enough time for nitrification to partially convert ammonium into nitrite and nitrate. For example, the other 50% of the time can be given to support the anoxic heterotrophic denitrifers and the anammox, which can work simultaneously. This changing of ORP profile can be achievable through activating the DC field for some time (time-ON) at a current density strong enough to produce enough electrons to satisfy oxygen needs of electrons and neutralize its function as the major electron acceptor. Afterwards, $NO_3^-$ can start to take over the role as the major electron acceptor and later nitrite at the anammox conditions. Once this limit is reached, the DC field is deactivated so that no more electrons can be discharged. Then, the system can be given enough time (time-OFF) to recover its oxygen content to a level that can support the aerobic conditions after which another cycle starts to repeat the process once again.

Step 6:

For example, another pathway of N removal in the system is the hydrogen trophic denitrification in which some bacteria species can be capable of using the $H_2$ gas produced at the cathode (reaction 3) as electron donor and nitrate as electron acceptor to denitrify it into $N_2$ gas (reaction 9).

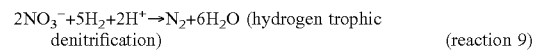

$2NO_3^- + 5H_2 + 2H^+ \rightarrow N_2 + 6H_2O$ (hydrogen trophic denitrification) (reaction 9)

The above electrokinetic control of ORP for promoting the removal of nutrients and carbon can be applied into batch reactor and continuous flow reactor (including completely mixed activated sludge reactor and membrane bioreactor). An application to continuous flow reactor with submerged membrane module (SMEBR) is presented below.

Example 1

Figure 2:
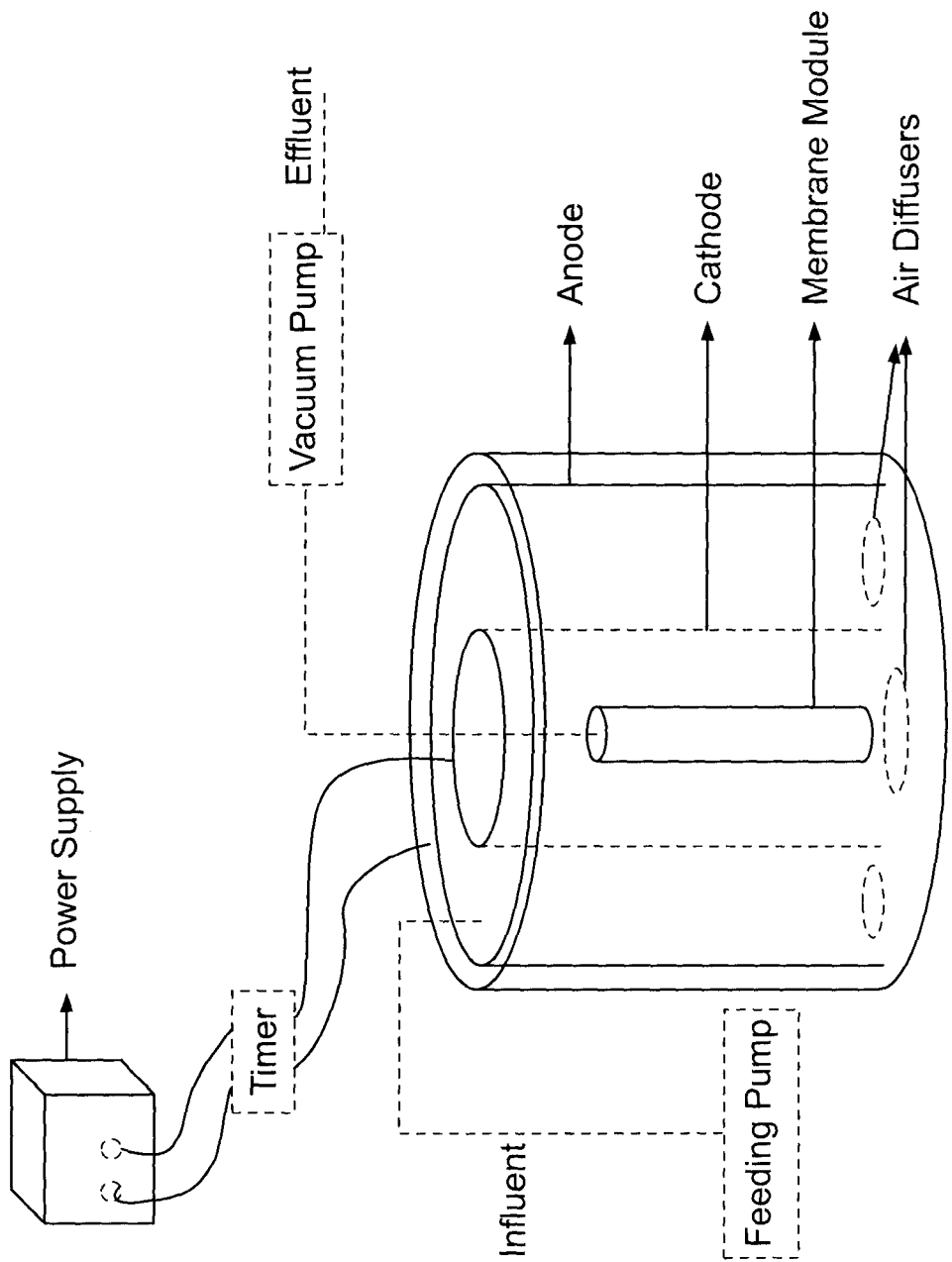
FIG. 2 is a schematic diagram of a bioreactor according to another example of the present disclosure.

In this experiment, one submerged membrane electro-bioreactor SMEBR (FIG. 2) and one submerged membrane bioreactor (MBR) without electrical field to serve as a control were operated simultaneously. They were fed with the same mixture comprising synthetic wastewater and activated sludge and run at the same operating conditions to create perfect comparing conditions. SMEBR outer body was composed of a cylindrical polyethylene container (20 L). The design is adequate to patented SMEBR system (Elektorowicz et al., 2009). In the middle of this reactor, a hollow fiber ultrafiltration membrane module was placed vertically. Air diffusers were inserted on top and below the membrane to provide air intensity enough to mitigate fouling on the membrane surface. Two cylindrical perforated electrodes (aluminum anode and stainless steel cathode) were placed around the membrane as demonstrated in FIG. 2. Direct current power supply connected with an electrical timer was applied to provide the required current density and exposure mode (time-ON/time-OFF). Vacuum pump was connected to the membrane outlet to extract the liquid phase of the sludge liquor at a constant flow rate.

Based on preliminary batch and continuous flow reactors tests, a current density of about 15 $A/m^2$ and electrical exposure modes of 5'-ON/20'OFF were applied to generate sufficient dosing of $Al^{+3}$ to cause the removal of phosphorus and enough electron flux to change the ORP profile to fluctuate between −100 to +150 and thus transforming N into gas. During the operation, the dissolved oxygen (DO) concentration was fluctuating to verify the influence of oxygen concentration on the ORP profile. In this example, the influent synthetic wastewater had different sources for nitrogen, for example, chemically bound nitrogen (easily dissolving ammonium sulfate) and organic compounds rich in ammonium (yeast extract and peptone) that release nitrogen in the ammoniacal form once degraded by the biomass.

Several runs were conducted to reach the targeted results. For example, run 1 was operated at the highest influent concentration of TN=110 mg-N/L. Run 2 at lower concentration of TN=57 mg-N/L to study the removal efficiency at different levels of organic N. Run 2 consisted of Run 2a performed at hydraulic retention time (HRT) of 12.8 h and Run 2b at longer HRT of 24 h. Run 3 was operated based on glucose as a carbon source and ammonium sulfate as the sole source of ammonium in order to know exactly the concentration of ammonium in the influent. This run was conducted for evaluating the nitrification potential of the SMEBR and the control MBR. SMEBR was expected to exhibit higher nitrification potential due to the electrokinetic steps (electrical activation of different types of N transforming bacteria).

The activated sludge was brought from the activated sludge reactor in the wastewater treatment plant just before starting the experiments. The mixed liquor concentration (MLSS) was adjusted between 2000 to 3000 mg/L before used in the reactors. No sludge whatsoever was disposed except for the sludge sampled for analyses. When the MLSS concentration increased to a sufficiently high level that causes high membrane fouling rate, the MLSS concentration was diluted to maintain a reasonable fouling rate. This allowed studying the impact of electrical operating conditions on the reactor performance at different MLSS as well. Samples were taken periodically from the influent, effluent and from the sludge supernatant (after centrifugation at 4000 rpm for 20 minutes). Sludge pH, electrical conductivity (EC) and DO were measured continuously.

Figure 3:
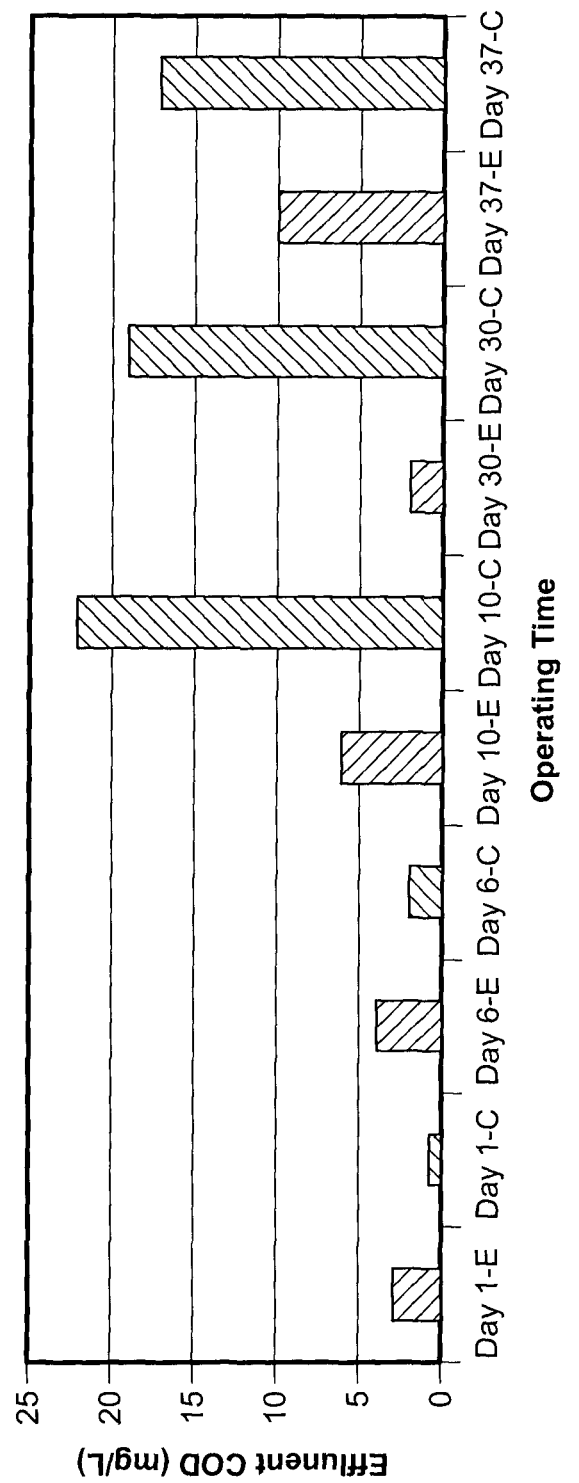
FIG. 3 is a graph showing the Chemical Oxygen Demand (COD) in an effluent over the treatment time, in an example of a process according to the present disclosure, wherein E refers to the use of a first type of reactor (SMEBR) and wherein C refers to the use of a second type of reactor (MBR)

The removal efficiency of COD was very high in SMEBR (>99%) as well as in MBR (>97%) even after a long operating period as shown in Run 2b (FIG. 3). This indicates that the microbial flocs were able to recover the electrical impact. After 45 days of operations the biomass was highly active and performed the oxidation of organic materials to the highest level. However, slightly higher removal efficiency was achieved in the SMEBR due to the capability of this system to coagulate the colloidal organic materials or even those with high molecular weight.

Figure 4:
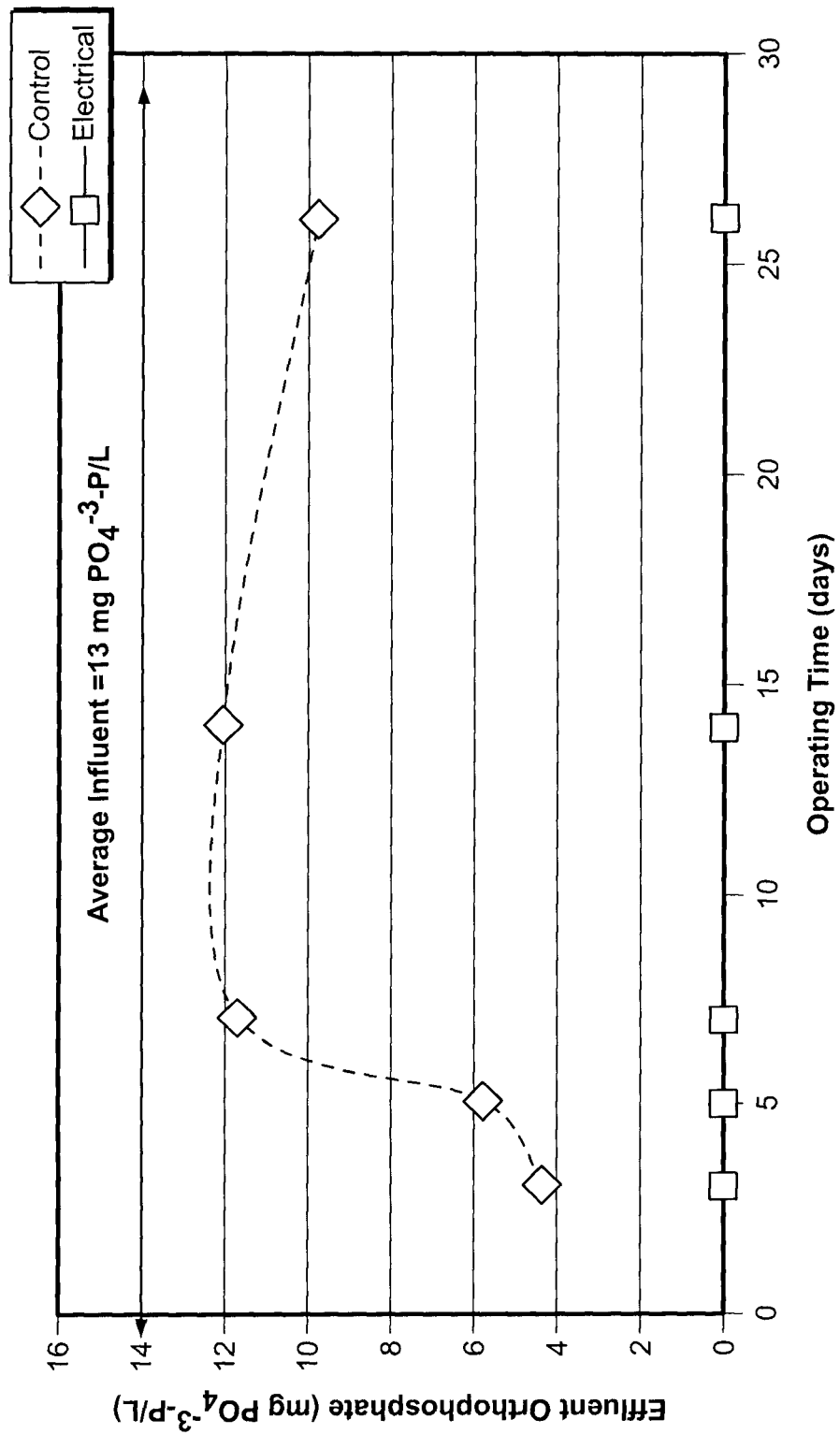
FIG. 4 is a graph showing the phosphorus removal as a function of time in an example of a process according to the present disclosure, wherein "electrical" refers to the use of a first type of reactor (SMEBR) and wherein "control" refers to the use of a second type of reactor (MBR)

All runs of SMEBR showed almost complete removal efficiency of phosphorous (FIG. 4). The electro-chemical dosing of $Al^{+3}$ into the system at these electrical parameters was enough to form complexes with phosphorus and extract it from the liquid phase of the sludge. On the other hand, the effluent orthophosphate concentration in the MBR stabilized around 12 mg $PO_4^{3-}$ −P (less than 10% removal—common case in conventional MBR). Other Runs exhibited similar behaviour.

Figure 5A:
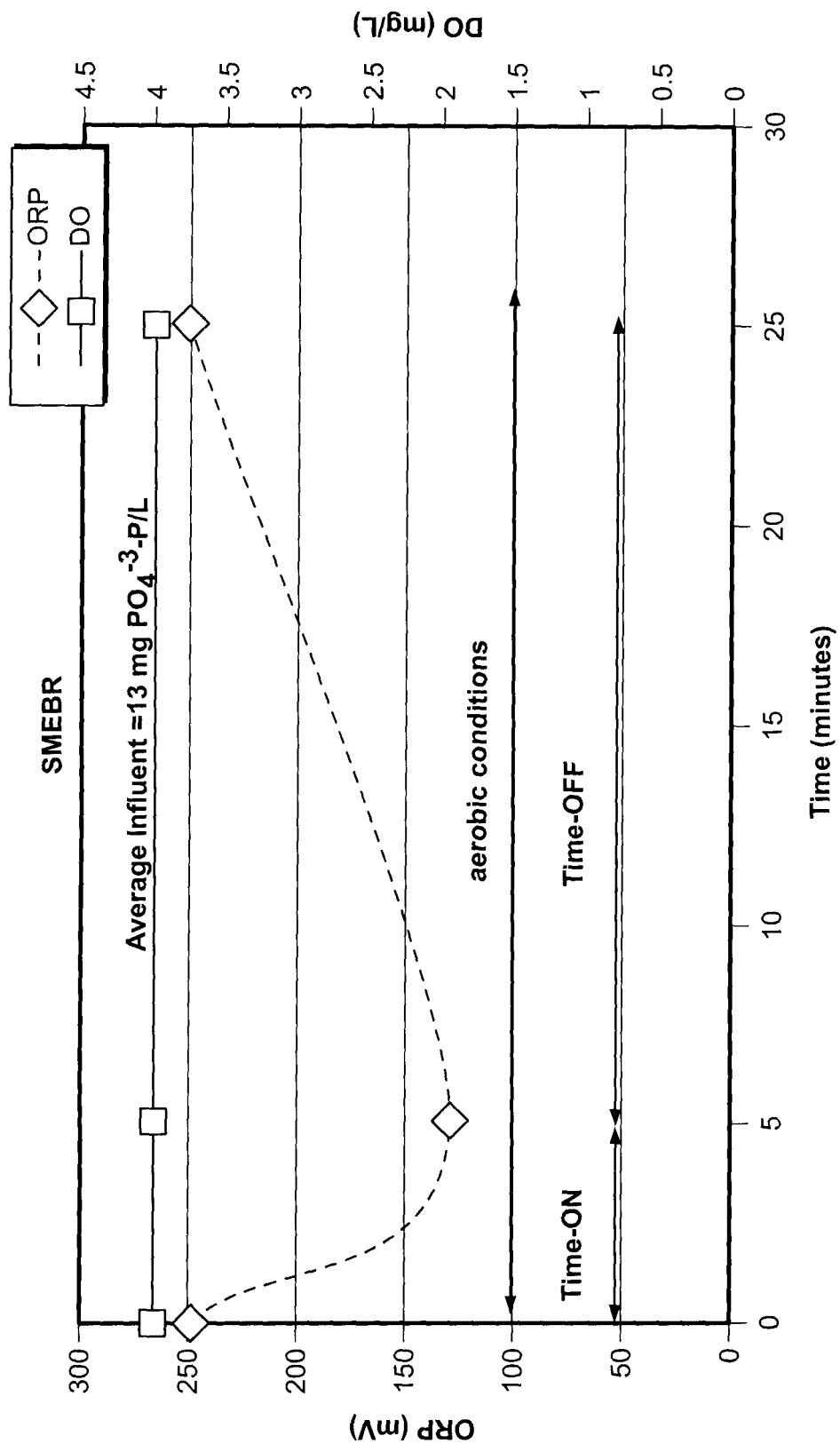
FIGS. 5a, 5b, 5c and 5d show the fluctuation of ORP overtime at different levels of dissolved oxygen concentrations in processes according to various examples of the present disclosure.
Figure 5B:
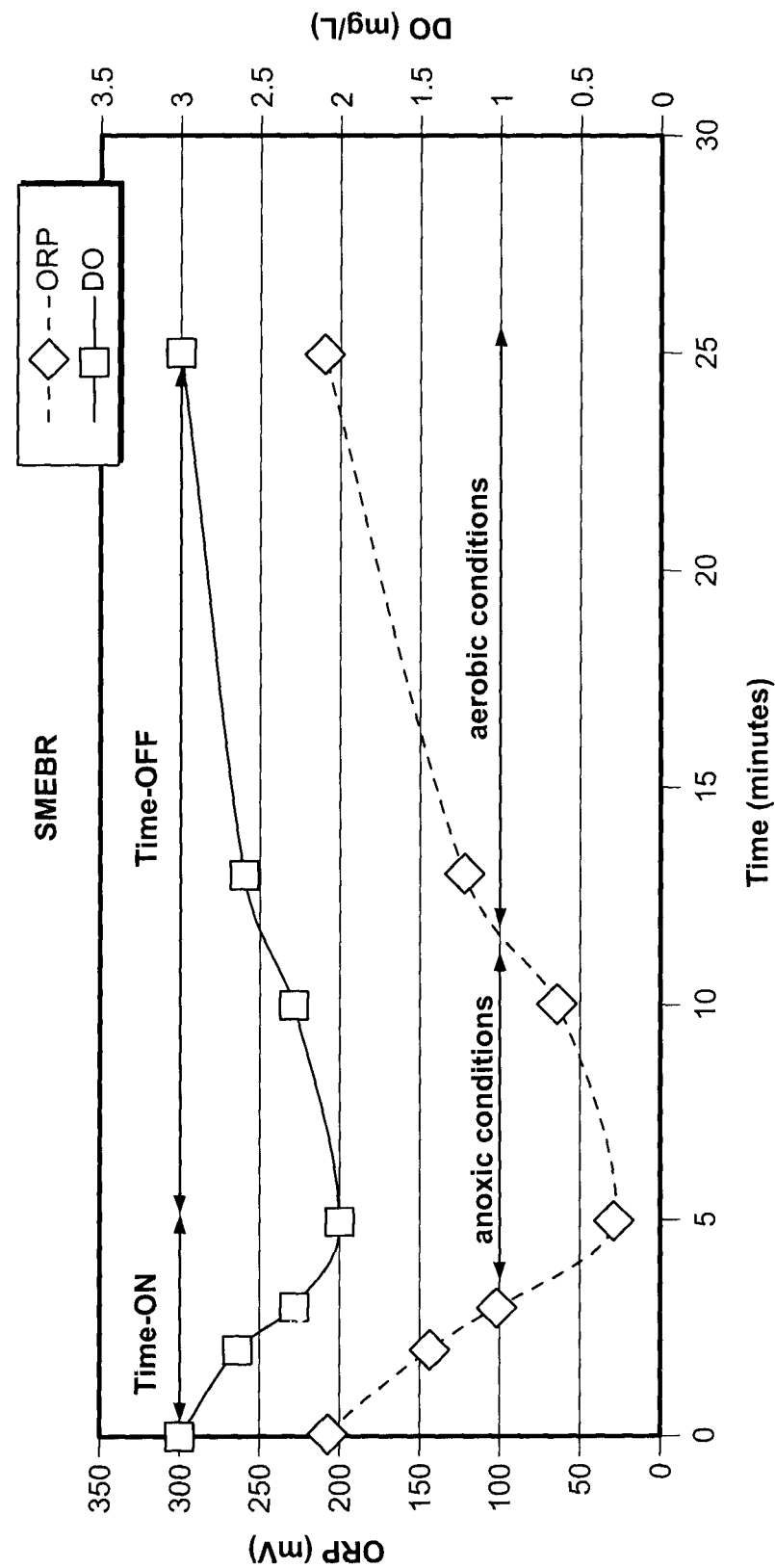
Figure 5C:
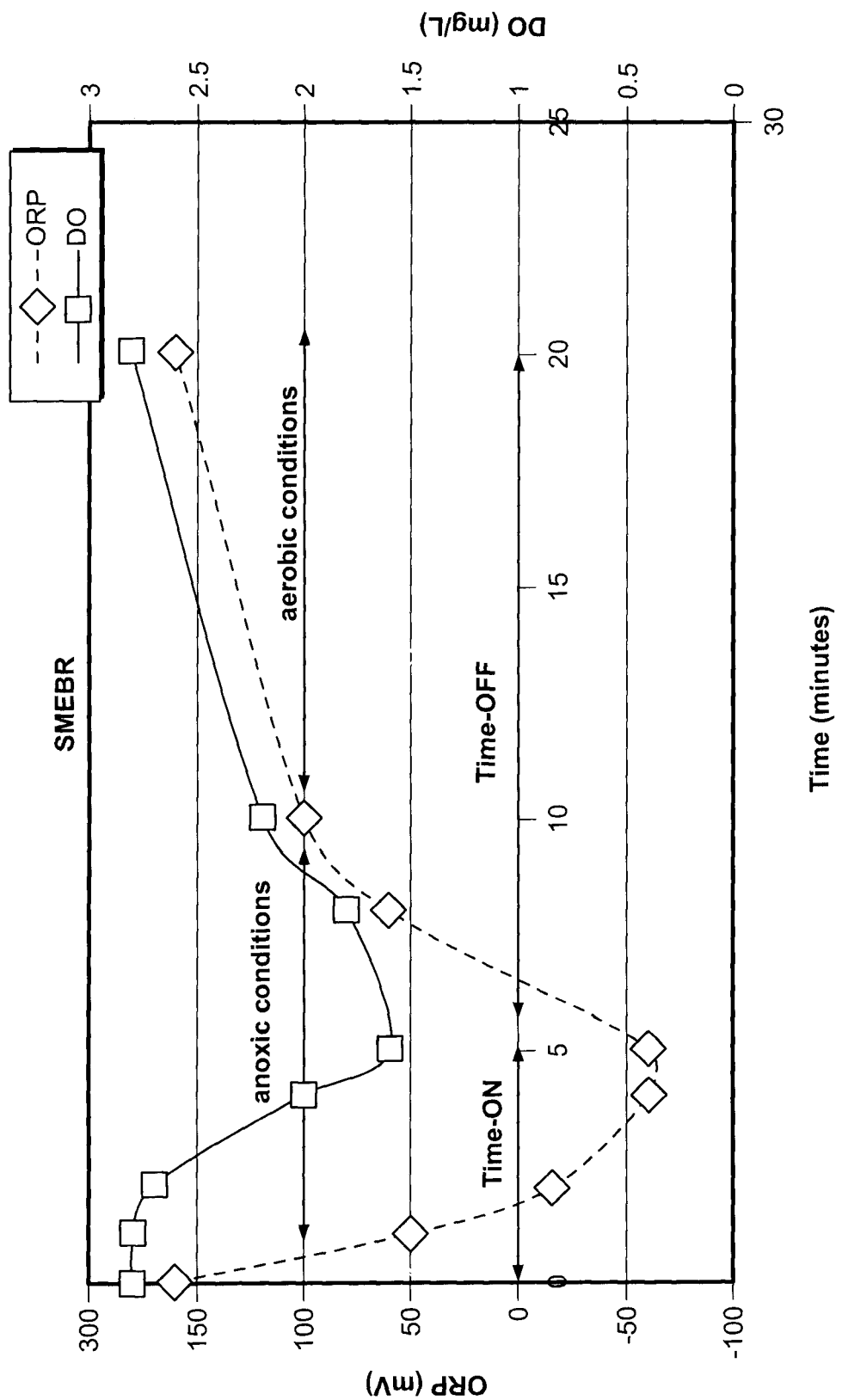
Figure 5D:
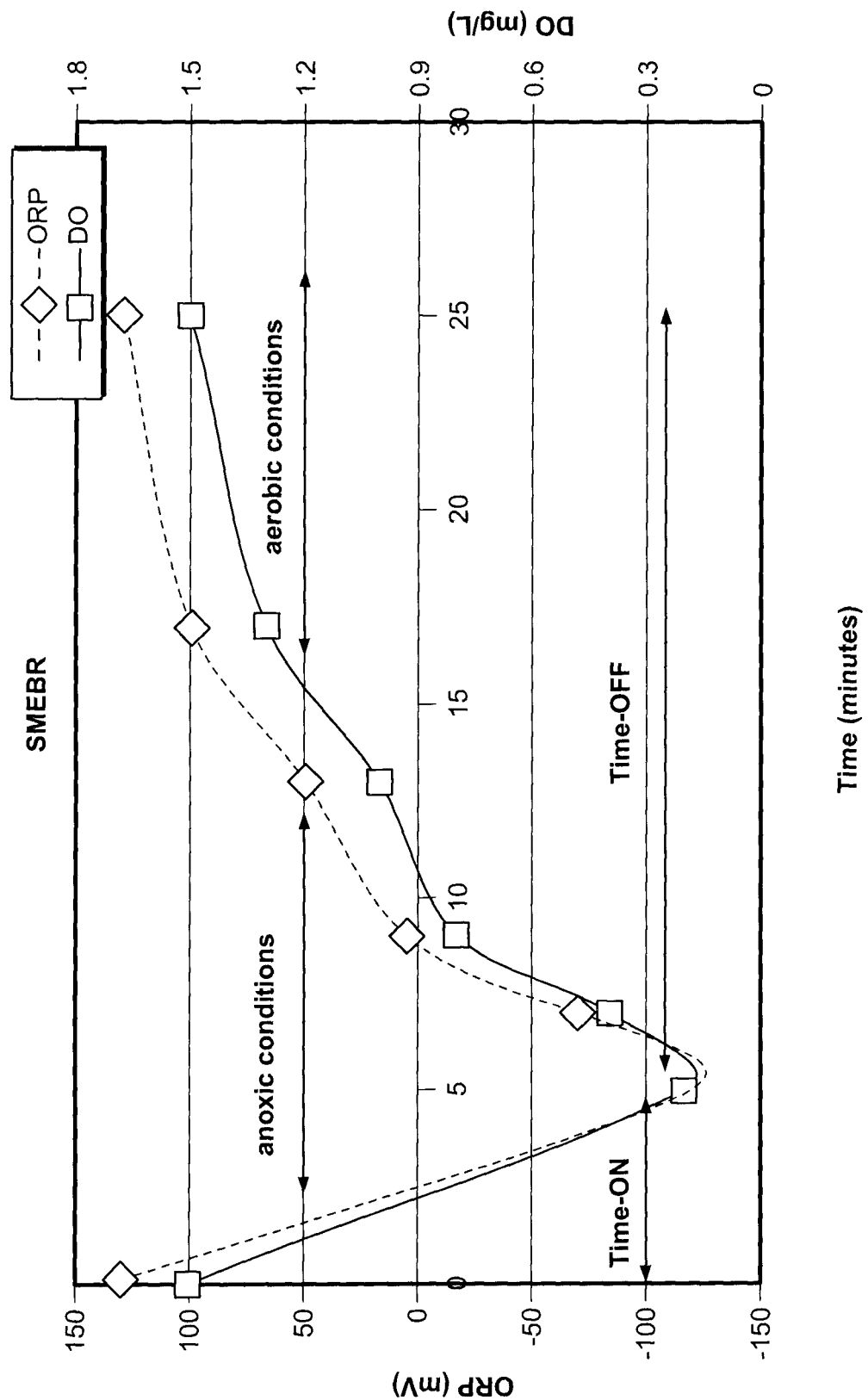

Complete transformation of N into gas in one reactor can require the fluctuation of the ORP between the anoxic/anammox and the aerobic conditions. For example, in order to force the ORP to adequately fluctuate, the electrical operating parameters (current density, voltage gradient and exposure mode) can be adjusted with the other operating conditions such as the organic loading, HRT and MLSS, which determines the biological oxygen demand and the diffusivity of gases in the system. Obtaining an ORP fluctuating between −150 to +150 mV can be achieved at different levels of DO based on the operating conditions. For example, working at low MLSS requires high DO concentration because the diffusivity of electrons in the reactor is high and can easily reach the DO and deactivate its role as the dominant electron acceptor. Likewise, at high MLSS, low DO concentration is required since the movement of the electrons is hindered by the low diffusivity of the reactor. For example, at current density of 17 $A/m^2$, MLSS of 10,000 mg/L and exposure mode of 5'-ON/20'-OFF did not show any significant changes in ORP due to the abundance of DO. Once the DO was reduced to 4 mg/L, a slight reduction of ORP was observed (from 250 to 130 mV) that is not enough to develop anoxic conditions (FIG. 5a). As the DO was lowered again (2 to 3 mg/L), the ORP declined down to 30 mV for a short period of time, which is not enough to cause significant denitrification of nitrate under perfect anoxic conditions (FIG. 5b). Further reduction of DO (1.5 to 2.5 mg/L) showed more reduction of ORP down to −60 mV at the end of time-ON, at which the DO concentration was at its lowest level (FIG. 5c) Once the time OFF started, the ORP began to recover its starting value (ORP=+155 mV). Each electrical cycle was divided into nearly 50% of typical anoxic condition followed by 50% of typical aerobic conditions. Further reduction of DO to 0.2 at the end of time-ON and up to 1.6 mg/L at the end of time-OFF permitted the ORP to drop down to −130 mV where anammox conditions developed and enhanced nitrification of ammonium is likely to take place (FIG. 5d). Working at ORP profile fluctuating between −150 to +150 mV was found to exhibit the best conditions for N removal. Furthermore, nitrification potential of the SMEBR reactor was higher than the control reactor due to the activation of anammox as another pathway of nitrification.

Run 2 was operated at an influent total nitrogen (TN) of 57 mg-N/L split between the organic N (yeast extract and peptone) and inorganic ammonium sulfate.

Figure 6:
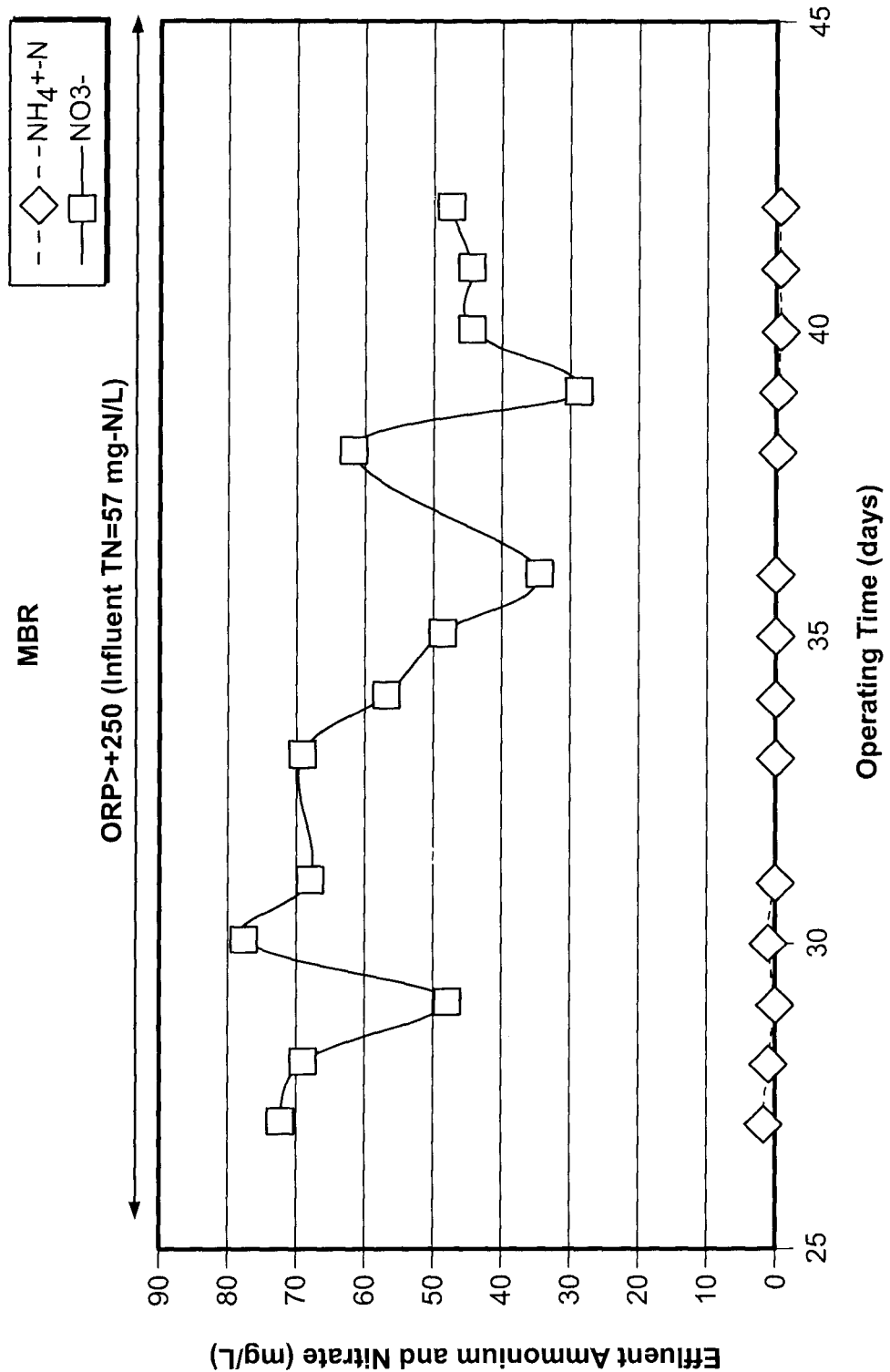
FIGS. 6 and 7 show the concentrations of ammonium and nitrate in the electrical bioreactor (SMEBR) and control (MBR) as a representative example which shows the superiority of the electrical bio-reactor over other conventional processes.
Figure 7:
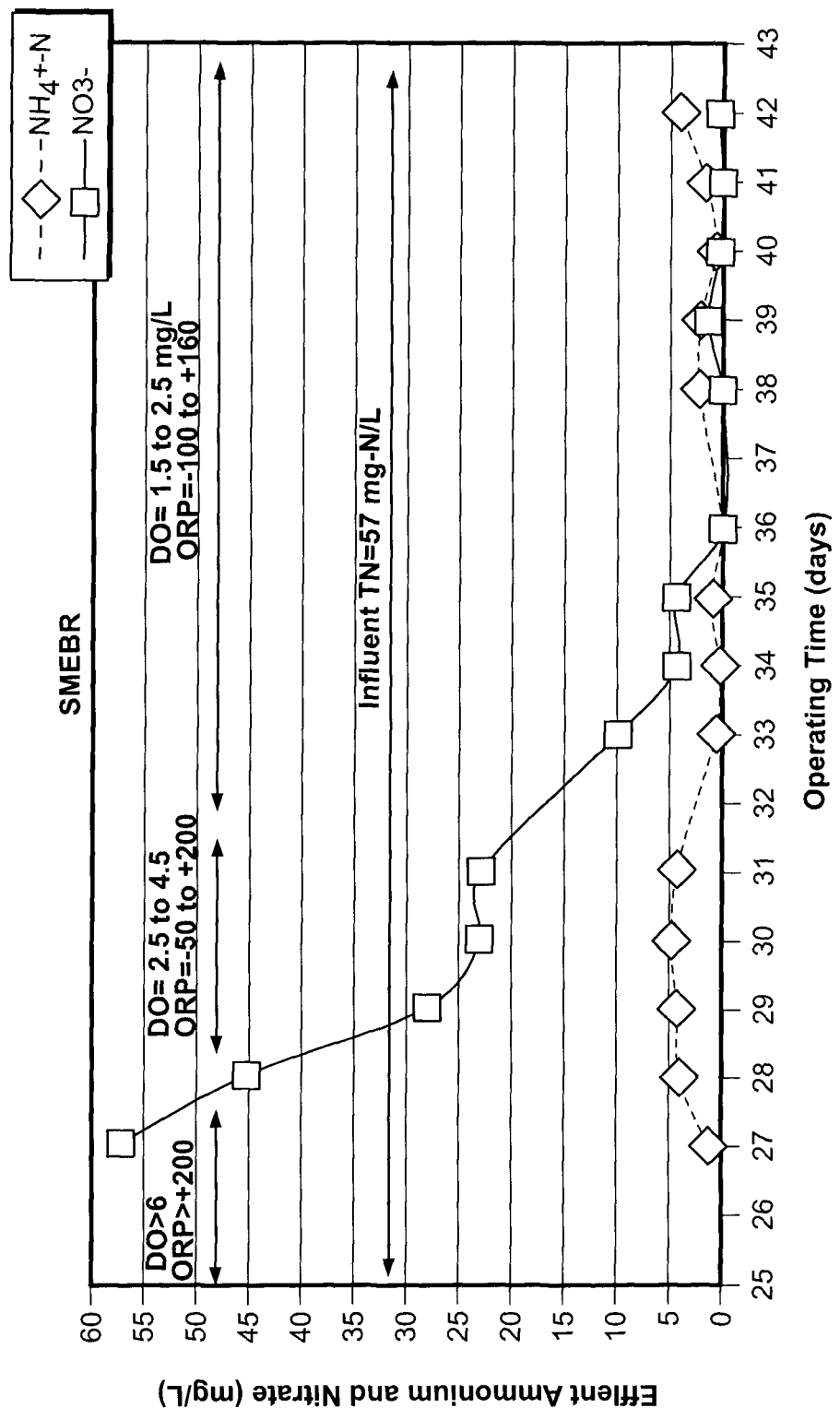

Run 2b was the continuation of Run 2a but at longer HRT of 24 h, and the ORP profile was adjusted in SMEBR between −100 to +150 mV starting on day 33 to support the simultaneous nitrification/denitrification conditions (FIGS. 6 and 7). In the MBR, typical nitrification condition led to more than 99% conversion of ammonium into nitrate, and the concentration of nitrate was almost higher than 40 mg-$NO_3^-$/L. The SMEBR proved the possibility of achieving almost complete nitrification of ammonium and complete denitrification of nitrate if the loading of ammonium into the reactor is lower than the nitrification capacity of the system, which was the case in that run. The removal efficiency of TN was up to 97% on day 40.

Figure 8:
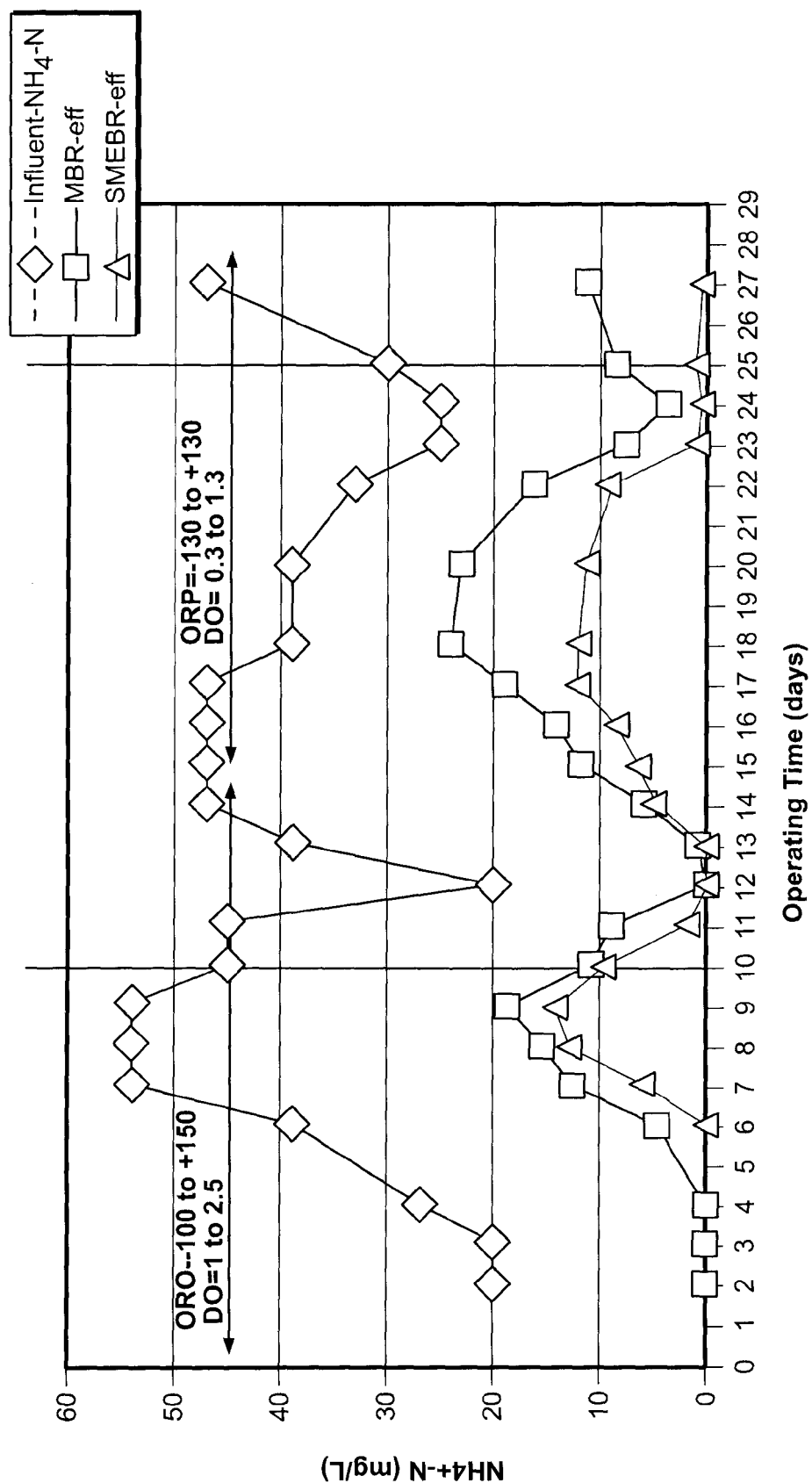
FIGS. 8 and 9 show the enhancement of the nitrification capability of the SMEBR by 50% as indicated by the changes in effluent concentrations of ammonium at different levels of influent ammonium during processes according to various examples of the present disclosure.
Figure 9:
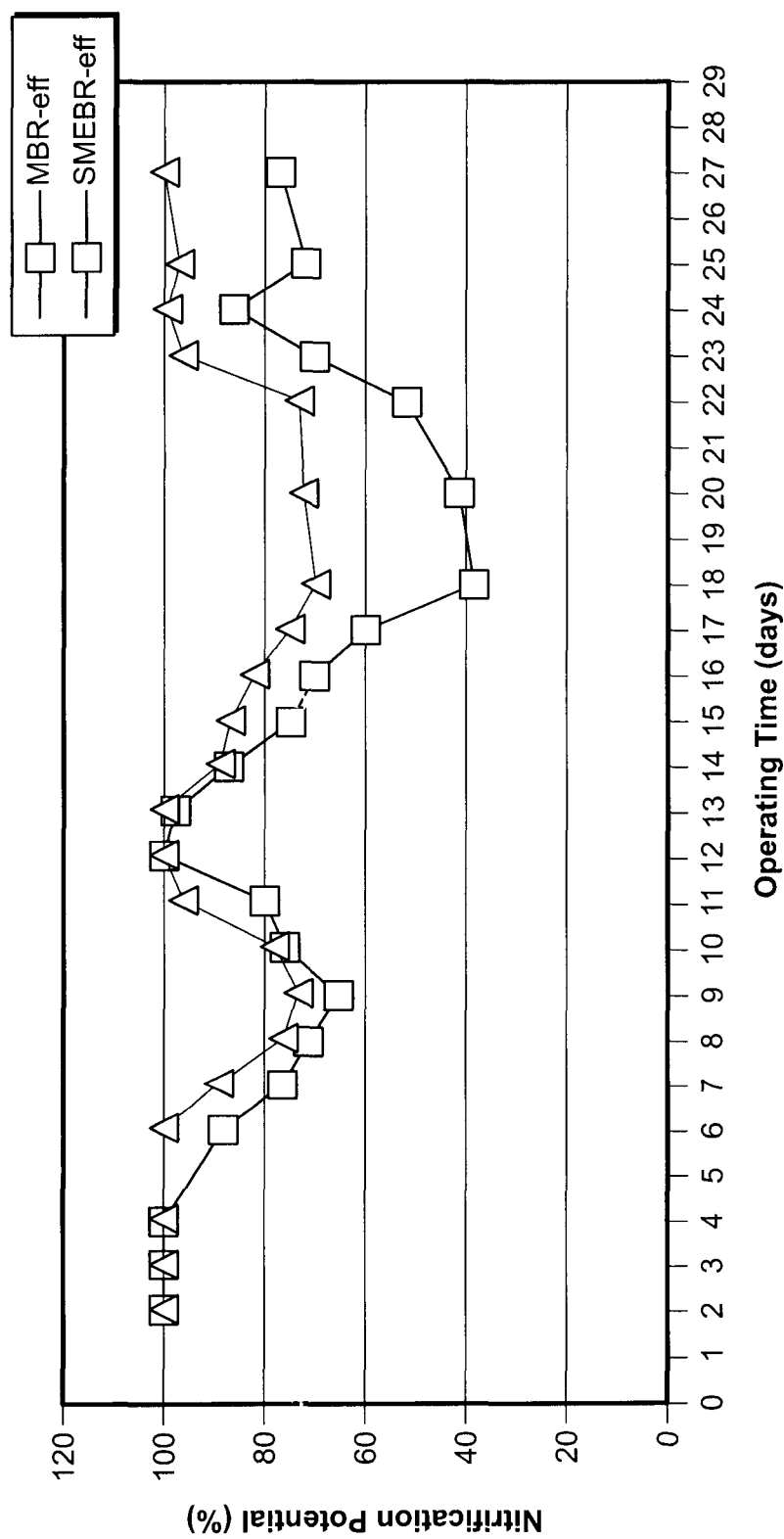
Figure 10:
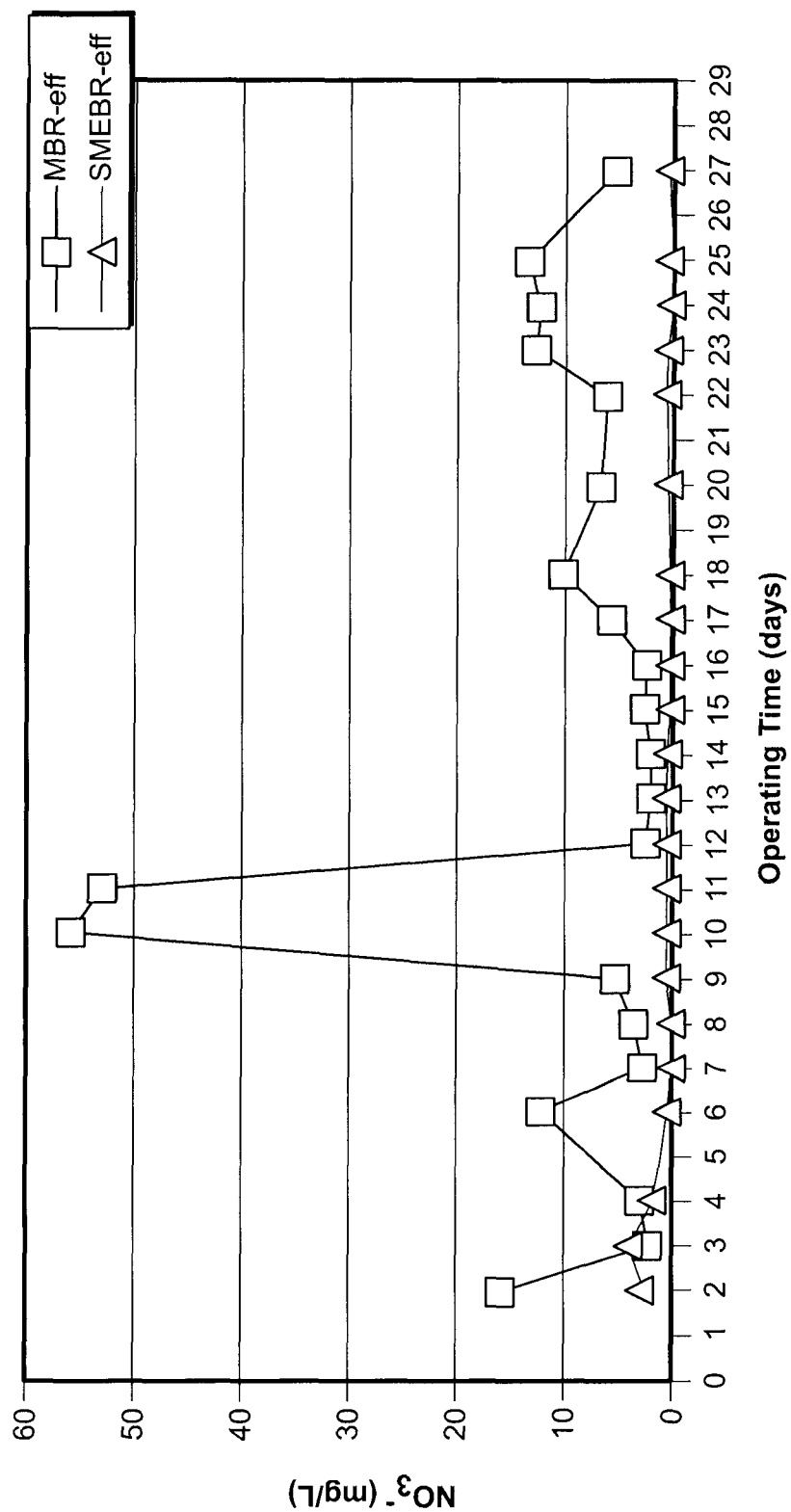
FIG. 10 is a curve showing the comparison of the nitrate concentration during two examples of processes according to the present disclosure, wherein the examples were carried out in different reactors.

Run 3 was conducted to examine the nitrification potential of SMEBR and MBR. In that run, ammonium sulfate was used as the sole source of ammonium in order to assess the nitrification potential of each reactor. When the SMEBR operated at DO of 1 to 2.5 mg/L and ORP fluctuating between −100 to 150 mV, an increase of up to 10% in the nitrification potential was achieved because of combined aerobic and anaerobic nitrification in the SMEBR compared to only aerobic nitrification in the MBR (FIGS. 8 and 9). On the other hand, by 50% enhanced nitrification potential was achieved in the SMEBR as the ORP was adjusted between −130 to 130 mV at DO from 0.3 to 1.3 mgL because more anammox bio-reactions were taking place in the reactor at that level of oxygen. However, the enhanced nitrification was not at the expense of the denitrification. Nitrate concentration in the SMEBR effluent was very low (<0.2 mg-$NO_3^-$/L) over the whole operating period (FIG. 10). For example, on day 27, when the reactors were fed with 47 mg-$NH_4$—N/l. the MBR produced effluent with 11 mg-$NH_4$—N/L, 5 mg-$NO_3^-$/L and total nitrogen of 20.8 mg-N/L, while the SMEBR produced effluent with 0.2 mg $NH_4$—N/L, 0.02 mg $NO_3^-$/L and total nitrogen of 1 mg-N/L. The total nitrogen removal efficiency of the SMEBR was higher than 97% when the ammonium loading was less than 47 $NH_4^+$—N mg/L·d.

Figure 11:
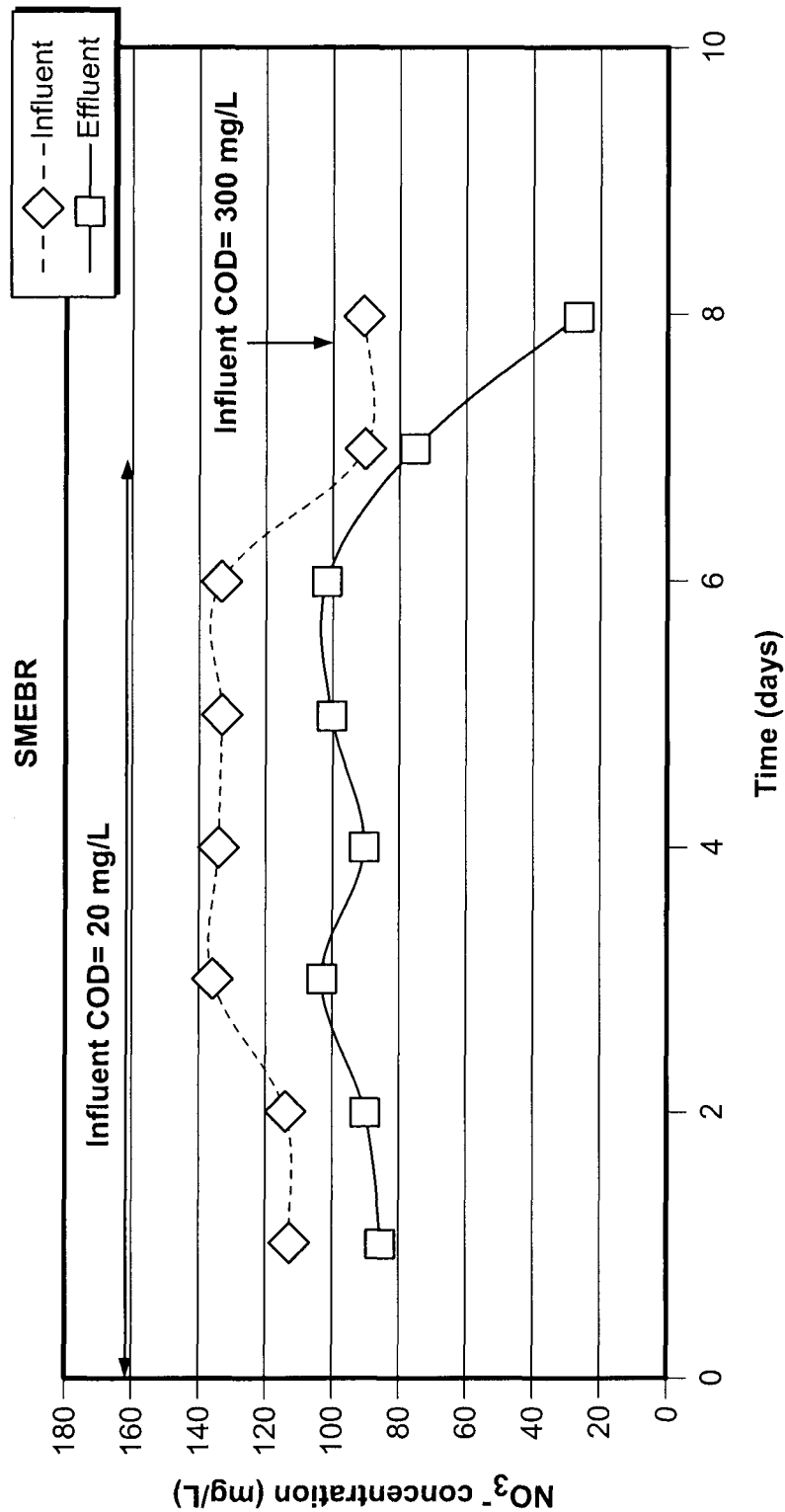
FIG. 11 is a curve showing the expected mechanisms of nitrate removal in the SMEBR during two examples of processes according to the present disclosure, wherein the examples were carried out in different reactors.

In SMEBR, denitrification was carried out in two different biological processes. The first process is the heterotrophic denitrification in which carbon is taken from the organic materials and nitrate serve as e-acceptor. The other denitrification process in SMEBR is through the autotrophic hydrogen denitrification in which the hydrogen produced at the cathode acts as electron donor and nitrate as electron acceptor. In order to evaluate the contribution of each process in the total denitrification potential of the SMEBR, a small experiment was conducted. In that experiment, the SMEBR was fed with an influent of high nitrate concentration and very low organic carbon source for 7 days (FIG. 11). On day 8, the influent was enriched with organic carbon. During the first 7 days of operation where no organic materials were injected into the reactor to eliminate the heterotrophic denitrifies, a slight reduction of nitrate was obtained (up to 25%). The reduction of nitrate concentration in the absence of organic carbon sources indicated the role of the hydrogen autotrophic denitrification, which takes its carbon needs from the inorganic sources such as carbonate and bicarbonate. On day 8 when the influent was high in organic carbon, the nitrate concentration was reduced substantially (72%). This outstanding reduction of nitrate in a short period of time confirmed that heterotrophic denitrification is the major contributor of transforming nitrate into gas. However, the hydrogen autotrophic denitrification existed in the reactor and contributed to an extra transformation of N into gas. In addition, the anammox process using nitrite from the incomplete nitrification as electron acceptor helped in reducing the production of nitrate in the reactor. Therefore, anammox with the other two denitrification processes (heterotrophic and H-denitrification) working simultaneously in one reactor ensured an effluent with a very low nitrate concentration, which was the case in this example.

In addition to the superior removal of nutrients (C, P and N), electro-bioreactor and processes of the disclosure provided extra benefits to the treatment process. These benefits include better sludge filterability and dewaterability, better flocs settleability, less soluble microbial products and colloidal materials in the sludge supernatant, a lower membrane fouling rate and thus better effluent quality. Electrical field, once applied properly, is able to change sludge characteristics through its versatile electro-kinetic processes that are taking place in the reactor such as electroosmosis, electrocoagulation and electrochemical reactions, and ultimately enhances its quality.

Figure 12:
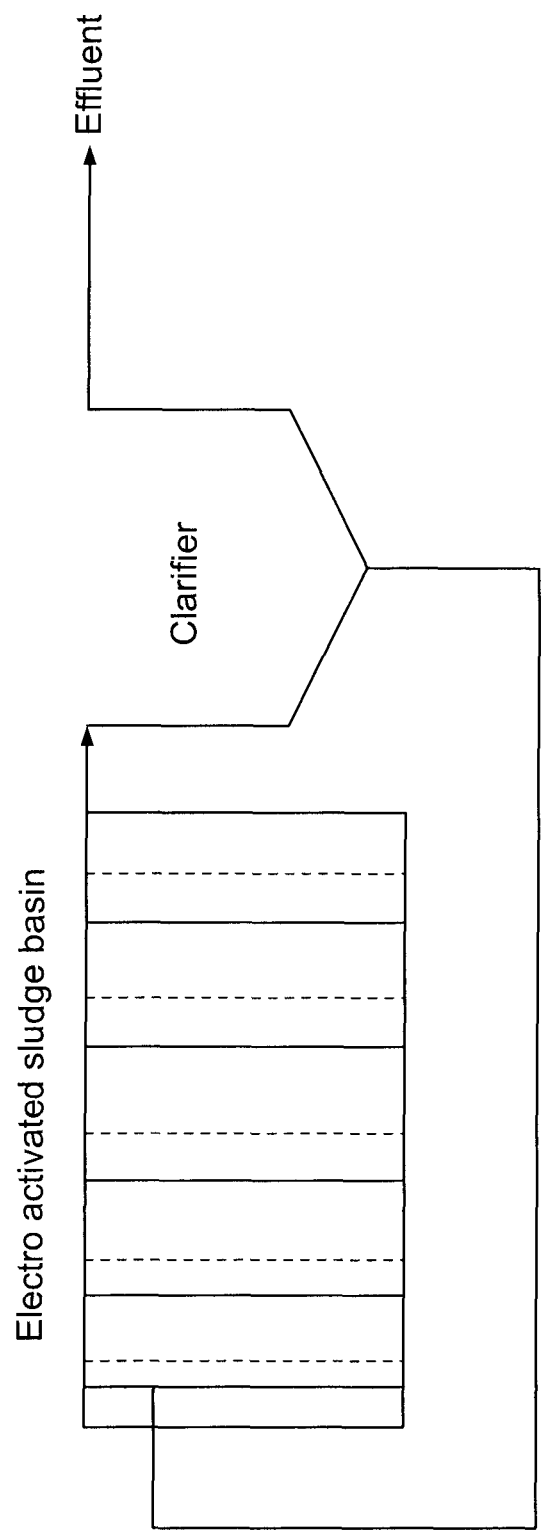
FIG. 12 is a schematic representation of an apparatus for treating wastewater in accordance with an example of the present disclosure in which anodes are represented with continuous lines and cathodes are represented with discontinuous lines.

Electrokinetic treatment for the removal of C, P and N in one reactor (a single reactor) can be installed as part of the new plants or in the retrofitting of the old ones. In fact, the processes described in the present disclosure are quite versatile and be carried out with a various different types of reactors. For example, it can be used using an existing reactor of a company or a plant, thereby significantly reducing the involved costs for such a company. It could be applied with or without membrane modules. The electrodes can be placed in parallel (rectangular shape) as in FIG. 12 or in circular configuration (see FIG. 2 concerning a circular configuration). The membranes could be placed in the middle of the circular electrodes or any other place rather than the electrical zone. For example, the electrical zone can compromise about 10 to about 80% of the total reactor volume. For example, the current density can be less than 50 A/$m^2$, at exposure modes 5'-ON-20'-OFF. Aluminum anodes in conjunction with other electrokinetic processes can effectively remove P and with controlled aerated system will provide suitable fluctuation of ORP based on the other operating conditions (HRT, MLSS, organic loading and solid retention time).

Example 2

Further tests have been made for simultaneously removing of carbon, phosphorous and nitrogen in a rectangular electro-bioreactor. The lab scale tests were carried out in rectangular 15 L reactor where three modules hollow fiber membranes were installed after two pairs of electrodes submerged in wastewater. Both aluminum anodes and stainless steel cathodes were perforated to permit on free flow throughout from point of wastewater supply towards membranes. Applied CD was less than 15 A/$m^2$ and a ratio of electrical zone to total volume of the electro-bioreactor was no more than of 0.4. The continuous flow reactor was fed with synthetic wastewater inoculated with activated sludge sampled at wastewater treatment plant. The influent of synthetic wastewater contained COD at the range of 892-999 mg/L as well as 16.8-17.4 mg $NH_3$—N/L, 0.23-0.24 mg $NO_3$—N/L and 15.3-22.1 mg $PO_4$/L.

Figure 13:
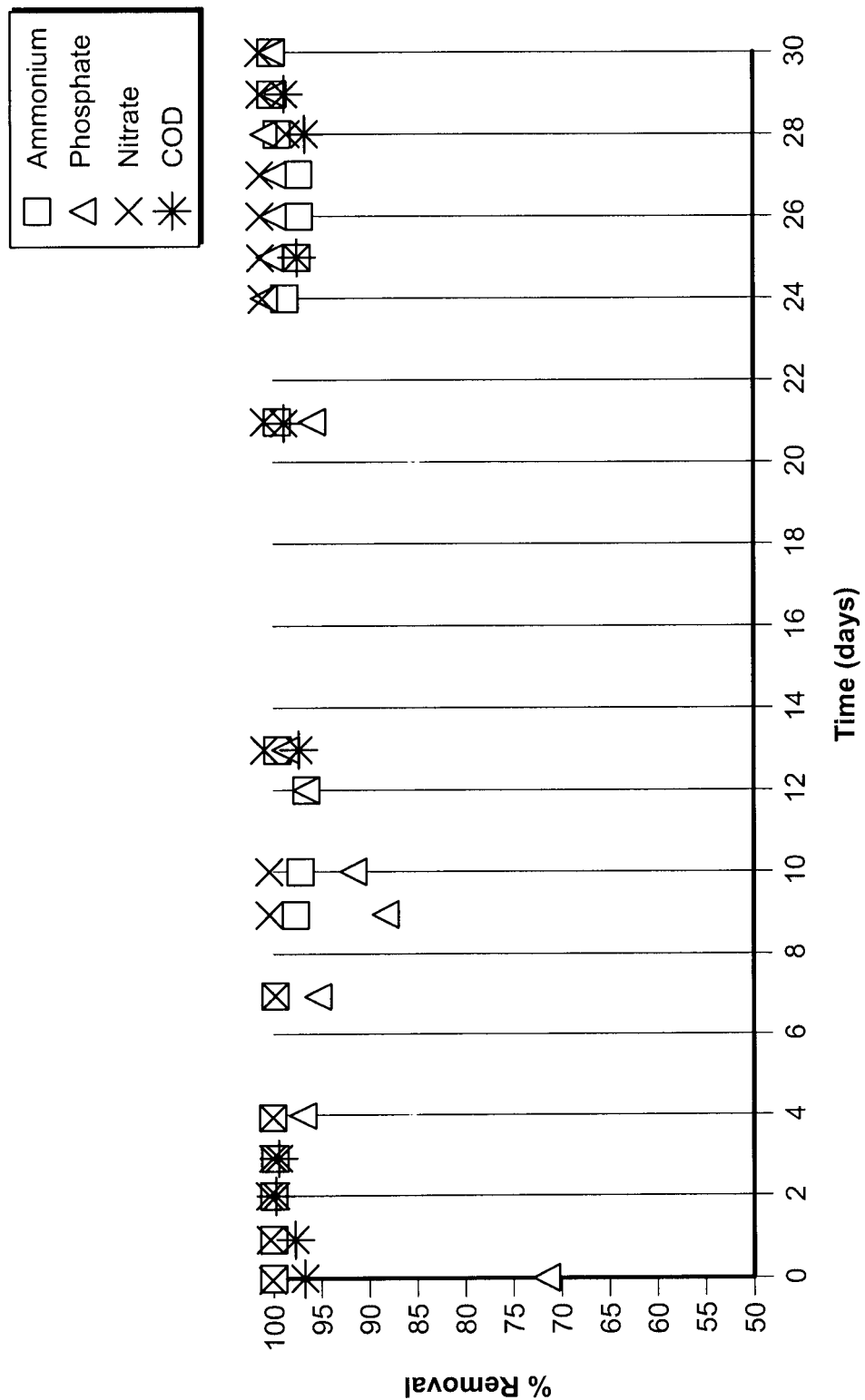
FIG. 13 is a graph showing the percentage of removal of ammonium, phosphate, nitrate and COD as a function of time (at equilibrium stage) in an example of a process according to the present disclosure.

The reactor has run for 5 months at a constant flow of 45 L/d and SRT of 15 days. The system was able to remove COD, phosphorous, ammonia by 99%, 99.7%, 99.7% respectively at equilibrium conditions. Entire removal of nitrates was also achieved simultaneously (FIG. 13). This experiment confirmed that the described processes are capable of simultaneous removal in the same electro-bioreactor of carbon, nitrogen and phosphorus. Furthermore, the system is efficient in various electrodes configurations as indicated in the present disclosure.

Example 3

Further tests have been made in order to verify the possibility of removing metals by using a process similar to the process of Example 1 using a SMEBR. A PVC cylindrical reactor (235 L), two cylindrical electrodes connected to a low DC power supply (intermittent supply of electrical field), and a hollow fiber microfiltration membrane (MUNC-600A, Microza, Asahi Kasei Chem. Corp., Japan) were used (see FIG. 2). The membrane had an effective surface area of 12.5 m$^2$, a pore size of 0.1 μm, and the module was equipped with a built-in bottom air diffuser for scouring. Several fine bubble air diffusers were also placed at the bottom of the reactor to supply the oxygen required for both mixing and microbial activity. SMEBR was continuously fed with pre-screened raw municipal wastewater containing metals (see Tables 2 and 3) redirected from the influent channel at a flow rate of 550 L/d for 7 weeks. SRT and HRT were 10 d and 11 h, respectively. SMEBR operated under constant current density less than 20 A/m$^2$, and volume of electrical zone to volume of the reactor was no higher than 0.5.

TABLE 2

Characteristics of influents during the testing period

| Parameters | SMEBR |
|---|---|
| $PO_4^{3-}$—P mg/L | 4.13 ± 1.84 |
| $NH_3^+$—N, mg/L | 42.9 ± 11.2 |
| $NO_3^-$—N, mg/L | 0.41 ± 0.11 |
| COD, mg/L | 316 ± 145.9 |

TABLE 3

Metal content in inffluent and effluent

| Contaminant | Influent (mg/L) | Effluent (mg/L) | Removal efficiency (%) |
|---|---|---|---|
| Ca | 5.9 | 0.0 | 100 |
| Pb | 0.009 | 0.0 | 100 |
| Fe | 1.8 | 0.27 | 85 |
| Cu | 0.05 | 0.0 | 100 |
| Zn | 0.46 | 0.09 | 80.4 |
| Ni | 12.5 | 0.24 | 98.1 |
| Mg | 0.072 | 0.009 | 87.5 |
| Cd | 0.75 | 0.04 | 94.6 |

Dissolved oxygen (DO), pH values, temperature, electrical current and voltage were continuously monitored. Samples from influent raw wastewater and treated effluent were collected four times per week and tested for COD, phosphorus, and ammonia, using Hach TNT vials. Samples were repeated twice and an average value was recorded. At the last stage of the SMEBR pilot test, metals such as Ni, Pb, Cd, Cu, Fe, Ca, Mg and Zn were also measured after digestion with nitric acid digested in samples of influent and effluent using an Atomic Absorption Spectrometer. (Perkin Elmer, Analyst 100). Readings were repeated three times for each sample and average values were reported. The hand-held NITON XRF analyzer was used to identify the elements present in electrode deposits as well as in the biosolids.

The obtained results showed that the SMEBR without any additional units was able to remove undesirable metals from wastewater (Table 3). High removal rates of Pb (100%), Ni (98.1%), Cu (100%), and Cd (94.6%) were reported at this range of pH (8-9) with very low concentrations in the treated effluent (0.0, 0.24, 0.0 and 0.04 mg/L for Pb, Ni, Cu, and Cd, respectively), while the removal rates of Mg, Zn, and Fe were 87.5%, 80.4%, and 85%, respectively. SMEBR produced a very high quality effluent where the concentrations of Ca, Mg, Zn, and Fe in the treated effluent were significantly low (0.0, 0.009, 0.09, and 0.27 mg/L, respectively).

Based on the results presented in the present application, these processes of the present disclosure have proved their capability of high removal efficiency of the unwanted components (C, P and N) in one single operation unit (a single reactor). The examples showed removal efficiency up to more than 97% for all nutrients when the electrical parameters and the other operating conditions (HRT, MLSS, DO and organic loading) were adjusted for that purpose. Carbon was removed through biomass oxidation; P was removed through the formation of aluminum phosphate complexes while N was transformed into nitrogen gas through electrically changing of the ORP to promote the simultaneous nitrification/denitrification processes in the reactor. Nitrification potential was enhanced up to 25% in the SMEBR due to the activation of anammox as another nitrification process working in harmony with the aerobic nitrifiers, while the SMBR does the nitrification only through the autotrophic nitrification.

Applying electrokinetics into wastewater reduces the plant footprints. Electrokinetics could be incorporated into already established facilities reducing any additional infrastructure. This upgrading process requires the immersion of the electrodes (at adequate distances) into the activated sludge basin to upgrade its performance and the effluent quality. The electro-bioreactor consumes low energy because the system works at low current density, low voltage and intermittent exposure to the electrical field. Finally, removal of the major environmentally hazardous nutrients in addition to the improvement of sludge characteristics in one single reactor is an important advancement in wastewater treatment technology that should be considered whenever better treatment quality is the concern.

The processes of the present disclosure can be applied to different treatment systems with different electrodes' configuration. They can be applied in combination with or without membranes. The membranes can be submerged and located within the center of the same reactor where electrodes are installed in circular or none circular form. The submerged membranes can also be located in different sides of a hybrid reactor in any justified position with respect to the electrodes (which can be flat or circular, perforated or not). Furthermore, the processes can be performed in electrode system sidewise, sideways or side by side (in separate compartments) with respect to membranes. The processes can also be performed in a separated compartment with electrodes located before or after any other wastewater treatment method. Thus, it can be used to upgrade (advanced treatment of) existing wastewater treatment plants with respect to carbon phosphorus, nitrogen and removal where filterability of sludge is improved.

While a description was made with particular reference to the specific embodiments, it will be understood that numerous modifications thereto will appear to those skilled in the art. Accordingly, the above description and accompanying drawings should be taken as specific examples and not in a limiting sense.

REFERENCES

Adam, c., R. Gnirss, B. Lesjean, H. Buisson and M. Kraume. 2002. Enhanced biological phosphorus removal in membrane bioreactors. Water. Science and Technology. 46(4-5):281-286

Ahn, K. H., K. G. Song, E. Cho, J. Cho, H. Yun, S. Lee and J. Kim. 2003. Enhanced biological phosphorus and nitrogen removal using a sequencing anoxic/anaerobic membrane bioreactor (SAM) process. Desalination. 157: 345-352

Chiu Y., L. Lee, C. Chang and A. Chao. 2007. Control of carbon and ammonium ratio for simultaneous nitrification and denitrification in a sequencing batch bioreactor. International Biodeterioration and biodegradation. 59: 1-7

Cho, J., K. G. Song, S. H. Lee and K. H. Ahn. 2005. Sequencing anoxic/anaerobic membrane bioreactor (SAM) pilot plant for advanced wastewater treatment. Desalination. 178: 219-225

Choi C., M. Kim, K. Lee and H. Park. 2009. Oxidation reduction potential automatic control potential of intermittently aerated membrane bioreactor for nitrification and denitrification. Water Science and Technology. 60(1): 167-173

Elektorowicz M., K. Bani Melhem and J. Oleszkiewicz. 2009. Submerged Membrane Electro-bioreactor-SMEBR, US 2010-0051542 A1

Fu Z., F. Yang, Y. An and Y. Xue. 2009. Simultaneous nitrification and denitrification coupled with phosphorus removal in an modified anoxic/oxic membrane bioreactor (A/O-MBR). Biochemical Engineering Journal. 43: 191-196

Jianlong W., Yongzen P., Shuying W and Yongqing G. 2008. Nitrogen removal by simultaneous nitrification and denitrification via nitrite in a sequence hybrid biological reactor. Chinese journal of Chemical Engineering. 16(5): 778-784

Kim H., H. Jang, H. Kim, D. Lee and T. chung. 2010. Effect of an electro phosphorus removal process on phosphorus removal and membrane permeability in a pilot-scale MBR. Desalination. 250: 629-633

Prosnansky, M., Y. sakakibara and M. Kuroda. 2002. High rate denitrification and SS rejection by biofilm-electrode reactor (BER) combined with microfiltration. Water research. 36: 4801-4810

Rezania B., J. A. Oleszkiewicz and N. Cicek. 2007. Hydrogen-dependent denitrification of water in an anaerobic submerged membrane bioreactor coupled with novel hydrogen delivery system. Water Res. 41:1074-1080

Rezania B., J. A. Oleszkiewicz and N. Cicek. 2006. Hydrogen-dependent denitrification of wastewater in anaerobic submerged membrane bioreactor: potential for water reuse. Water Science and Technology. 54(11-12):207-214

Sunger N. and Bose P. 2009. Autotrophic denitrification using hydrogen generated from metallic iron corrosion. Bioresource Technology. 100: 4077-4082

Trigo C., J. L. Campos, J. M. Gamido and R. Mendez. 2006. Start up of the anammox process in a membrane bioreactor. Journal of Biotechnology. 126: 475-487

Tsushima, I., Y. Ogasawara, T. Kindaichi, H. Satoh and S. Okabe. 2007. Development of high rate anaerobic ammonium oxidizing (anammox) biofilm reactors. Water Res. 41: 1623-1634

Udert K. M., E. Kind, M. Teunissen, S. Jenni and T. Larsen. 2008. Effect of heterotrophic growth on nitritation/anammox in a single sequencing batch reactor. Water Science and technology. 58(2): 277-284

Wu C., Z. chen, X. Liu and Y. Peng. 2007. Nitrification-denitrification via nitrite in SBR using real time control strategy when treating domestic wastewater. biochemical engineering journal. 36: 87-92

Yang J., L. Zhang, Y. Fukuzaki, D. Hire and K. furukawa. 2010. High rate nitrogen removal by the anammox process with a sufficient inorganic carbon source. Bioresource technology. 101: 9471-9478

Yoo, H., K. H. Ahn and H. J. Lee. 1999. Nitrogen removal from synthetic wastewater by simultaneous nitrification and denitrification (SND) via nitrite in an intermittently-aerated reactor. Water res. 33(1); 145-154

What is claimed is:

1. A process for treating wastewater, said process comprising:
    treating a mixture comprising said wastewater in a single activated sludge reactor, with a constant electric current having a density of less than about 55 A/m$^2$, by injecting a continuous flow of air into said mixture and by means of at least one anode and at least one cathode that define therebetween an electrical zone for treating said mixture, wherein a ratio volume of the electrical zone/total volume of the reactor is about 0.8 or less, wherein dissolved oxygen has a concentration of less than 5.0 mg/L in said mixture, and wherein said concentration of dissolved oxygen is controlled by electrons flowing between said at least one anode and said at least one cathode;
    fluctuating the oxidation-reduction potential in said activated sludge reactor between aerobic and anoxic/anaerobic conditions by exposing said mixture to an intermittent ON/OFF electrical exposure mode to said electric current in which an OFF period of time is about 1 to about 10 times longer than an ON period of time while maintaining said injecting of continuous flow of air into said mixture, wherein said OFF period of time provides aerobic conditions suitable for biological ammonium nitrification and said ON period of time provides anoxic/anaerobic conditions suitable for biological nitrate denitrification;
    maintaining a fluctuation of the oxidation-reduction potential between −150 mV and +150 mV relative to a reference electrode in the single reactor, wherein for about 50% of each electrical cycle the single reactor is under aerobic conditions and for the other about 50% of each electrical cycle the single reactor is under anoxic conditions, thereby obtaining another mixture comprising treated wastewater and solids.

2. The process of claim 1, wherein said electric current has a density of about 5 to about 45 A/m$^2$.

3. The process of claim 1, wherein said electric current has a density of about 10 to about 35 A/m$^2$.

4. The process of claim 1, wherein said ratio volume of said electrical zone/total volume of said reactor is about 0.1 to about 0.8.

5. The process of claim 1, wherein said ON period of time has a duration of about 1 to about 20 minutes.

6. The process of claim 1, wherein said ON period of time has a duration of about 3 to about 7 minutes.

7. The process of claim 1, wherein said OFF period of time has a duration of about 10 to about 180 minutes.

8. The process of claim 1, wherein said OFF period of time has a duration of about 10 to about 30 minutes.

9. The process of claim 1, wherein said process is carried out with a gradient voltage of about 0.1 V/cm to about 20 V/cm.

10. The process of claim 1, wherein said solids comprise organic solids and inorganic solids.

11. The process of claim 1, wherein said another mixture comprises $N_2$.

12. The process of claim 1, wherein during said treatment, nitrogen contained in said wastewater is converted into $N_2$ and separated from said wastewater.

13. The process of claim 1, further comprising separating said treated wastewater from said solids.

14. The process of claim 1, wherein said electric current has a density of about 15 to about 20 A/m$^2$.

15. The process of claim 1, wherein said process comprises adjusting electrokinetics and dissolved oxygen concentration so as to control activity of different types of microorganisms that are responsible for at least one biological process in the reactor.

16. The process of claim 15, wherein said process comprises adjusting electrokinetics and dissolved oxygen concentration so as to control activity of aerobic nitrifiers, anammox nitrifiers, heterotrophic denitrifiers and hydrogen trophic denitrifiers in the reactor that are responsible for converting ammonia in said wastewater into N$_2$ gas.

17. The process of claim 15, wherein said at least one biological process in the reactor is chosen from removal of carbon and removal of phosphorus.

18. The process of claim 1, wherein the dissolved oxygen has a concentration of less than 3.0 mg/L in said mixture.

19. The process of claim 1, wherein the dissolved oxygen has a concentration of less than 2.5 mg/L in said mixture.

20. The process of claim 1, wherein the dissolved oxygen has a concentration of between about 1.0 and about 2.5 mg/L in said mixture.

21. The process of claim 1, wherein the dissolved oxygen has a concentration of between about 1.5 and about 2.5 mg/L in said mixture.

22. The process of claim 1, wherein the dissolved oxygen has a concentration of between about 0.2 and about 1.6 mg/L in said mixture.

\* \* \* \* \*